United States Patent
Stingu et al.

(10) Patent No.: US 11,888,331 B2
(45) Date of Patent: Jan. 30, 2024

(54) SUB-SURFACE WIRELESS CHARGING AND ASSOCIATED METHOD

(71) Applicant: Spark Connected LLC, Dallas, TX (US)

(72) Inventors: Petru Emanuel Stingu, Dallas, TX (US); Yulong Hou, Shanghai (CN); Kenneth Moore, Dallas, TX (US); Ruwanga Dassanayake, Dallas, TX (US)

(73) Assignee: Spark Connected LLC, Dallas, TX (US)

( * ) Notice: Subject to any disclaimer, the term of this patent is extended or adjusted under 35 U.S.C. 154(b) by 0 days.

(21) Appl. No.: 17/364,069

(22) Filed: Jun. 30, 2021

(65) Prior Publication Data

US 2022/0006332 A1 Jan. 6, 2022

Related U.S. Application Data

(60) Provisional application No. 63/046,987, filed on Jul. 1, 2020.

(51) Int. Cl.
*H02J 50/90* (2016.01)
*H02J 50/00* (2016.01)
*H02J 50/10* (2016.01)

(52) U.S. Cl.
CPC ............ *H02J 50/90* (2016.02); *H02J 50/005* (2020.01); *H02J 50/10* (2016.02)

(58) Field of Classification Search
CPC .......... H02J 50/90; H02J 50/005; H02J 50/10; H02J 50/12; H02J 50/60; H02J 50/00; H01F 38/14
See application file for complete search history.

(56) References Cited

U.S. PATENT DOCUMENTS

| | | |
|---|---|---|
| 3,376,578 A | 4/1968 | Sawyer |
| 3,735,231 A | 5/1973 | Sawyer |
| 4,860,183 A | 8/1989 | Maeda et al. |
| 5,434,504 A | 7/1995 | Hollis et al. |
| 5,498,948 A | 3/1996 | Bruni et al. |
| 6,175,169 B1 | 1/2001 | Hollis, Jr. et al. |

(Continued)

OTHER PUBLICATIONS

Texas Instruments "Industry-Leading Wireless Power Solutions—The Most Widely Adopted in the Market", ti.com/wirelesspower, SLYT485C, 3 pages.

(Continued)

*Primary Examiner* — Rexford N Barnie
*Assistant Examiner* — Rasem Mourad
(74) *Attorney, Agent, or Firm* — Slater Matsil, LLP

(57) ABSTRACT

In an embodiment, a method includes: wirelessly transmitting power to a receiving coil from a transmitting coil, where the receiving coil is in a wireless power transmission space of the transmitting coil; measuring an output of a sensor during a first time to generate a first measurement; measuring the output of the sensor during a second time to generate a second measurement, the second time being after the first time; and when a magnitude of a difference between the first measurement and the second measurement is higher than a predetermined threshold, stopping wirelessly transmitting power to the receiving coil with the transmitting coil.

28 Claims, 13 Drawing Sheets

(56) References Cited

U.S. PATENT DOCUMENTS

| | | | |
|---|---|---|---|
| 6,184,651 B1 | 2/2001 | Fernandez et al. | |
| 6,445,093 B1 | 9/2002 | Binnard | |
| 6,803,744 B1 | 10/2004 | Sabo | |
| 6,949,845 B2 | 9/2005 | Oisugi et al. | |
| 8,049,370 B2 | 11/2011 | Azancot et al. | |
| 8,193,769 B2 | 6/2012 | Azancot et al. | |
| 8,957,549 B2 | 2/2015 | Kesler et al. | |
| 9,590,444 B2 | 3/2017 | Walley et al. | |
| 9,800,191 B2 | 10/2017 | Barsilai et al. | |
| 9,853,441 B2 | 12/2017 | Teggatz et al. | |
| 10,054,622 B2 | 8/2018 | Hernandez et al. | |
| 10,079,090 B2 | 9/2018 | Teggatz et al. | |
| 10,168,443 B2 | 1/2019 | Mangano et al. | |
| 10,651,670 B1* | 5/2020 | Jiang | H02J 50/40 |
| 2006/0061323 A1 | 3/2006 | Cheng et al. | |
| 2010/0181841 A1 | 7/2010 | Azancot et al. | |
| 2010/0219183 A1 | 9/2010 | Azancot et al. | |
| 2010/0244579 A1 | 9/2010 | Sogabe et al. | |
| 2011/0050164 A1 | 3/2011 | Partovi et al. | |
| 2011/0062793 A1 | 3/2011 | Azancot et al. | |
| 2011/0074344 A1 | 3/2011 | Park et al. | |
| 2011/0121660 A1 | 5/2011 | Azancot et al. | |
| 2011/0227527 A1 | 9/2011 | Zhu et al. | |
| 2012/0032632 A1 | 2/2012 | Soar | |
| 2012/0242352 A1* | 9/2012 | Gong | H03K 17/9525 |
| | | | 324/656 |
| 2013/0049484 A1 | 2/2013 | Weissentern et al. | |
| 2013/0082651 A1 | 4/2013 | Park et al. | |
| 2013/0207480 A1* | 8/2013 | Sheng | H02J 50/80 |
| | | | 307/104 |
| 2013/0257172 A1 | 10/2013 | Teggatz et al. | |
| 2013/0264973 A1 | 10/2013 | Garg et al. | |
| 2013/0285601 A1 | 10/2013 | Sookprasong et al. | |
| 2013/0300204 A1 | 11/2013 | Partovi | |
| 2014/0080409 A1 | 3/2014 | Frankland et al. | |
| 2014/0119082 A1 | 5/2014 | Mueck et al. | |
| 2014/0184150 A1 | 7/2014 | Walley | |
| 2015/0054453 A1* | 2/2015 | White, II | G01R 29/0814 |
| | | | 320/108 |
| 2015/0091511 A1* | 4/2015 | Ichikawa | H02J 50/12 |
| | | | 320/108 |
| 2015/0115877 A1 | 4/2015 | Arai et al. | |
| 2015/0142348 A1 | 5/2015 | Huang et al. | |
| 2015/0249484 A1 | 9/2015 | Mach et al. | |
| 2015/0323694 A1* | 11/2015 | Roy | G01V 3/081 |
| | | | 307/104 |
| 2015/0341087 A1 | 11/2015 | Moore et al. | |
| 2016/0013661 A1* | 1/2016 | Kurs | H02J 50/005 |
| | | | 307/104 |
| 2016/0134127 A1* | 5/2016 | Yang | H02J 50/10 |
| | | | 307/104 |
| 2016/0149440 A1 | 5/2016 | Staring et al. | |
| 2016/0226296 A1 | 8/2016 | Bae et al. | |
| 2017/0163100 A1 | 6/2017 | Vocke et al. | |
| 2018/0014709 A1 | 1/2018 | O'Brien et al. | |
| 2019/0021701 A1* | 1/2019 | Vardi | A61B 5/0008 |
| 2019/0068004 A1* | 2/2019 | Louis | H02J 50/12 |
| 2019/0109498 A1* | 4/2019 | Stingu | H03F 3/217 |
| 2019/0190320 A1 | 6/2019 | Park | |
| 2019/0319494 A1 | 10/2019 | Park et al. | |
| 2019/0334388 A1 | 10/2019 | Van Wageningen et al. | |
| 2021/0138917 A1* | 5/2021 | Kanakasabai | G01V 3/101 |
| 2021/0234411 A1* | 7/2021 | Cai | H02J 50/60 |
| 2022/0069637 A1* | 3/2022 | Khromova | H04B 5/0037 |

OTHER PUBLICATIONS

Texas Instruments, "Introduction to Wireless Power", QI WPC 1.1 compliant, www.ti.com/wirelesspower, 49 pages.

Consumer Reports, "Wireless charging pad review We tested four popular pads to see whether they really make your life easier", Wireless Charging Pad Reviews, Dec. 11, 2013, 5 pages.

Digi-Key Electronics, "Inductive Versus Resonant Wireless Charging: A Truce May Be a Designer's Best Choice", Contributed By Digi-Key's North American Editors, Aug. 2, 2016, 8 pages.

Gao, Xiang, "Demodulating Communication Signals of Qi-Compliant Low-Power Wireless Charger Using MC56F8006 DSC", NXP Freescale Semiconductor Application Note, Document No. AN4701, Rev. 0, Mar. 2013, 21 pages.

Jansen, J. W., et al., "Overview of analytical models for the design of linear and planar motors", TU/e Eindhoven University of Technology, DOI: 10.1109/TMAG/2014.2328556, Jan. 1, 2014, 8 pages.

Johns, Bill et al., "Adapting Qi-compliant wireless-power solutions to low-power wearable products", Texas Instruments, High-Performance Analog Products, 2Q, 2014, Analog Applications Journal, 7 pages.

Kot, Thomas, "LC Sensor Rotation Detection with MSP430 Extended Scan Interface (ESI)", Texas Instruments, Application Report, SLAA639, Jul. 2014, 33 pages.

Lynch, Brian T., "Under the Hood of a DC/DC Boost Converter", Texas Instruments, Power Supply Design Seminar, Paper SEM1800, Dallas, TX, USA, 2008-2009, 26 pages.

Rice, John, "Examining Wireless Power Transfer", Texas Instruments, 2014/2015 Power Supply Design Seminar, 38 pages.

Waters, Benjamin et al., "Optimal Coil Size Ratios for Wireless Power Transfer Applications", IEEE International Symposium on Circuits and Systems (ISCAS), Jun. 1-5, 2014, 4 pages.

Wikipedia, "Electromagnetic coil", https://en.wikipedia.org/w/index.php?title=Electromagnetic_coil&oldid=776415501, Apr. 2017, 6 pages.

Wikipedia, "Inductive charging", https://en.wikipedia.org/w/index.php?title=Inductive_charging&oldid=802615270, Sep. 2017, 7 pages.

Wikipedia, "Qi (standard)", https://en.wikipedia.org/w/index.php?title=Qi_(standard)&oldid=803427516, Oct. 2017, 5 pages.

Wireless Power Consortium, "The Qi Power Transfer System Power Class 0 Specification—Parts 1 and 2: Interface Definitions", Version 1.2.3, Feb. 2017, 165 pages.

Zens, "Zens First Worldwide to Introduce Built-in Wireless (Sub-)Surface Charger with Apple and Samsung Fast Charge", Mar. 23, 2018, 5 pages.

* cited by examiner

PRIOR ART

| Movement detection | | Wireless power receiver size |
|---|---|---|
| x-axis small | x-axis large | |
| no | no | - |
| no | yes | large |
| yes | no | small |
| yes | yes | - |

SUB-SURFACE WIRELESS CHARGING AND ASSOCIATED METHOD

CROSS-REFERENCE TO RELATED APPLICATIONS

This application claims the benefit of U.S. Provisional Application No. 63/046,987, entitled "Sub-Surface Wireless Charger," and filed on Jul. 1, 2020, which application is hereby incorporated herein by reference.

TECHNICAL FIELD

The present disclosure relates generally to an electronic system and method, and, in particular embodiments, to Sub-Surface Wireless Charging.

BACKGROUND

Wireless charging systems are becoming ubiquitous in today's society. For example, many smartphones and wearables implement wireless charging technology. Ease of use, greater reliability, spatial freedom, reduced connectors and openings, and the possibility of hermetically sealing are among the benefits offered by wireless charging. Wireless charging standards allow for interoperability between different devices and manufacturers. Some wireless charging standards, such as the Qi standard (e.g., version 1.2.3) from the Wireless Power Consortium, and standards promoted by the AirFuel alliance, are becoming widely adopted. The Qi standard uses inductive charging operating between 80 kHz and 205 kHz to wirelessly transmit power from a transmitter to a receiver. Standards promoted by the AirFuel alliance implement resonant wireless charging operating at 6.78 MHz to wirelessly transmit power from a transmitter to a receiver.

FIG. 1 shows exemplary wireless charging system 100. Wireless charging system 100 includes wireless power transmitter (TX) 102, which includes a transmitting coil $L_{TX}$, and wireless power receiver (RX) 104, which includes a receiving coil $L_{RX}$. During wireless charging, wireless power transmitter 102 transmits wireless power to wireless power receiver 104 by causing current $I_{TX}$ to flow through TX LC tank 106. The magnetic field generated by transmitting coil $L_{TX}$ as a result of the flow of current $I_{TX}$ induces current $I_{RX}$ to flow through LC tank 108. Voltage $V_{RX}$ generated across terminals of RX LC tank 108 is rectified by rectifier 116 to produce rectified voltage $V_{RX\_DC}$. Rectified voltage VRX_DC may be used to power a load, such as a microcontroller, a battery charger, and/or a power converter.

SUMMARY

In accordance with an embodiment, a method includes: wirelessly transmitting power to a receiving coil from a transmitting coil, where the receiving coil is in a wireless power transmission space of the transmitting coil; measuring an output of a sensor during a first time to generate a first measurement; measuring the output of the sensor during a second time to generate a second measurement, the second time being after the first time; and when a magnitude of a difference between the first measurement and the second measurement is higher than a predetermined threshold, stopping wirelessly transmitting power to the receiving coil with the transmitting coil.

In accordance with an embodiment, a wireless power transmitter includes: a transmitting coil configured to wirelessly transmit power towards a wireless power transmission space; a ferrite core; a housing disposed between the transmitting coil and the wireless power transmission space, where the ferrite core is disposed between the transmitting coil and the housing; a sensor; and a controller configured to: measure an output of the sensor during a first time to generate a first measurement, measure the output of the sensor during a second time to generate a second measurement, the second time being after the first time, and when a magnitude of a difference between the first measurement and the second measurement is higher than a predetermined threshold, detect movement of a wireless power receiver in the wireless power transmission space.

In accordance with an embodiment, a wireless power transmitter includes: a transmitting coil configured to wirelessly transmit power towards a wireless power transfer space; a ferrite core; a housing disposed between the transmitting coil and the wireless power transfer space, where the ferrite core is disposed between the transmitting coil and the housing; a flex printed circuit board (PCB) disposed between the transmitting coil and the housing; a first differential coil disposed between the transmitting coil and the housing, the flex PCB including the first differential coil; and a controller configured to: measure an output of the first differential coil during a first time to generate a first measurement, measure the output of the first differential coil during a second time to generate a second measurement, the second time being after the first time, and when a magnitude of a difference between the first measurement and the second measurement is higher than a predetermined threshold, detect movement of a wireless power receiver in the wireless power transfer space.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention are described in a specific context, sub-surface wireless charging systems and methods. Embodiments of the present invention may be used in other systems, such as other types of wireless charging systems, for example. Some embodiments may be used in systems different than wireless charging systems, such as position detection systems, for example.

It is understood that the term wireless charging is not limited to the charging of a battery, but includes wireless power transmission generally, unless stated otherwise.

In an embodiment of the present invention, a sensor for movement detection is used to prevent damage to a wireless power receiver. In some embodiments, when the wireless power receiver moves during wireless power transfer, movement is detected and the sub-surface wireless charger takes an action in response, such as stopping charging or reducing the amount of power being wirelessly transferred to the wireless power receiver. In some embodiments, the sensor for movement detection is implemented with a light sensor. In some embodiments, the sensor for movement detection includes, instead of or in addition to a light sensor, differential coils and/or concentric coils.

Figure 1:
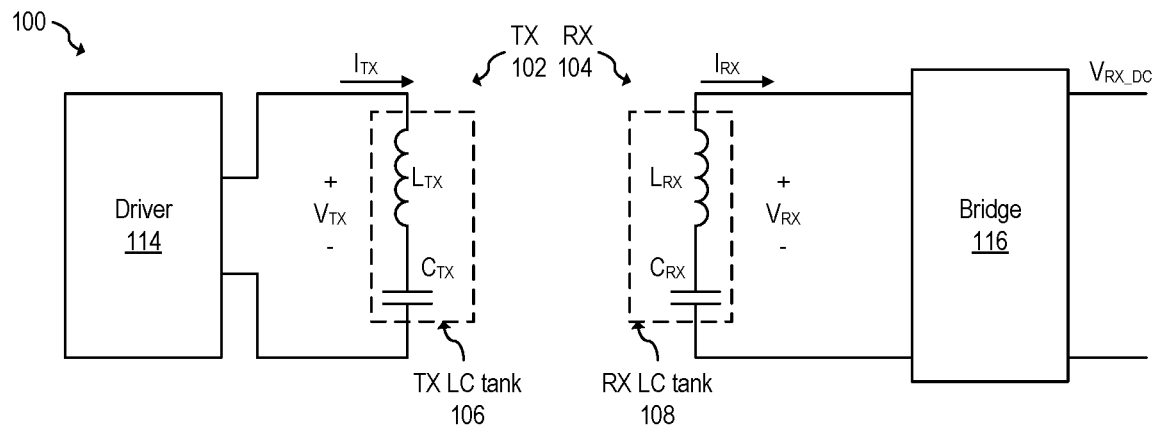
FIG. 1 shows an exemplary wireless charging system.
Figure 2:
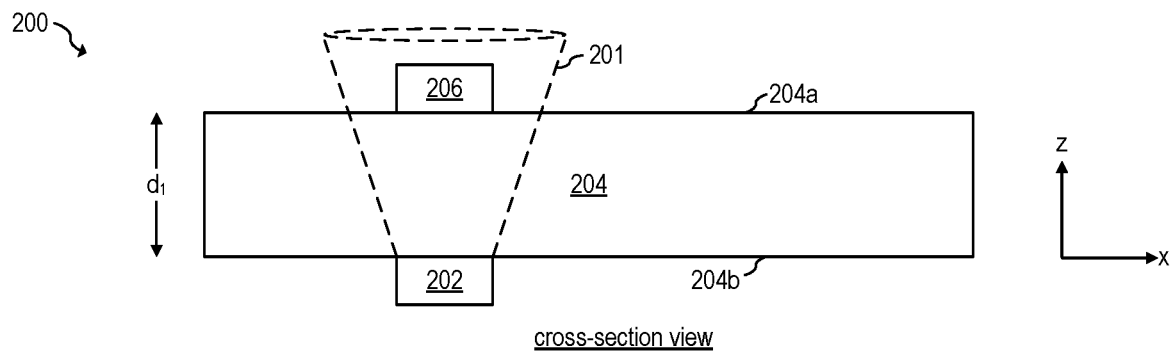
FIG. 2 shows a schematic diagram of a sub-surface wireless charging system, according to an embodiment of the present invention.

FIG. 2 shows a schematic diagram of sub-surface wireless charging system 200, according to an embodiment of the present invention. Sub-surface wireless charging system 200 includes sub-surface wireless power transmitter 202 (also referred to as sub-surface wireless charger 202), surface 204, and wireless power receiver 206. Surface 204 includes top surface 204a, and bottom surface 204b. Sub-surface wireless power transmitter 202 is attached to bottom surface 204b (e.g., glued, screwed, etc.). Wireless power receiver 206 is disposed over top surface 204a, e.g., when wireless power receiver 206 is to receive wireless power from sub-surface wireless power transmitter 202.

During normal operation, sub-surface wireless power transmitter 202 receives power, e.g., from mains, and wirelessly transmits power through surface 204 using, e.g., a transmitting coil $L_{TX}$, into charging space 201 (also referred to as a wireless power transmission space). Wireless power receiver 206 wirelessly receives power from sub-surface wireless power transmitter 202 (e.g., using a receiving coil $L_{RX}$) and uses such received power to, e.g., operate wireless power receiver 206, charge a battery (not shown) coupled to wireless power receiver 206, and/or retransmit power (e.g., wirelessly), e.g., to another device (not shown), for example.

In some embodiments, sub-surface wireless power transmitter 202 may operate in accordance with a wireless charging standard, such as a Qi standard (e.g., version 1.2.3), e.g., at a frequency of 80 kHz to 400 kHz, or in accordance to an AirFuel standard, e.g., at a frequency of 6.78 MHz. Other implementations are also possible.

The intensity of the power received by wireless power receiver 206 from sub-surface wireless power transmitter 202 may depend, in part, on the distance between wireless power receiver 206 and sub-surface wireless power transmitter 202. For example, generally, the closer wireless power receiver 206 is to sub-surface wireless power transmitter 202, the higher the intensity (magnitude) of wireless power received by wireless power receiver 206 from sub-surface wireless power transmitter 202.

Surface 204 may be, for example, a table, a wall, or another surface. Although surface 204 is illustrated as a planar horizontal surface, it is understood that surface 204 may be a vertical surface, such as a wall, or an inclined surface. In some embodiments, surface 204 may not be planar.

Surface 204 may be made of wood, stone, glass, ceramic, plastic, and/or other non-conductive materials, for example. Surface 204 may have a thickness $d_1$ of, e.g., 20 mm. In some embodiments, thickness $d_1$ may be thicker than 20 mm, such as 25 mm, 30 mm, or thicker. In other embodiments, thickness $d_1$ may be thinner than 20 mm, such as 18 mm, 15 mm, 10 mm or thinner. In some embodiments, surface 204 is transparent or semitransparent. In other embodiments, surface 204 is not transparent.

In some embodiments, wireless power receiver 206 includes a receiving LC tank (e.g., 108) that includes a receiving coil $L_{RX}$ and a resonant capacitor $C_{RX}$, and a rectifying bridge (e.g., 116) for rectifying voltage $V_{RX}$ across the receiving LC tank.

In some embodiments, the rectifying bridge (e.g., 116) of wireless power receiver 206 may be implemented in any way known in the art, such as a synchronous bridge rectifier, for example.

In some embodiments, wireless power receiver 206 may be, for example, a smartphone, a tablet, a laptop, a wearable, a power tool, a countertop wireless power transmitter acting as a repeater, or another battery-operated portable device. Wireless power receiver 206 may be implemented as other devices. For example, in some embodiments, wireless power receiver 206 may not include a battery. In some embodiments, wireless power receiver 206 may be configured to operate only when wirelessly receiving power. In some embodiments, wireless power receiver 206 may not be a portable device. For example, in some embodiments, wireless power receiver 206 may be attached to top surface 204a. For example, in some embodiments, wireless power receiver 206 may be a thermostat to control a heating, ventilation, and air conditioning (HVAC) of a house, and surface 204 is a vertical wall, where sub-surface wireless power transmitter 202 is attached to the inside surface of the wall and the thermostat is attached to the outside surface of the wall.

In some embodiments, sub-surface wireless power transmitter includes a transmitting LC tank (e.g., 106) that includes a transmitting coil $L_{TX}$ and a resonant capacitor $C_{TX}$, and a driver (e.g., 114) for driving the transmitting LC tank. In some embodiments, sub-surface wireless power transmitter 202 may be capable of transferring 10 W of wireless power to wireless power receiver 206. In some embodiments, sub-surface wireless power transmitter 202 may be capable of transferring more than to W of wireless power to receiver 206, such as 15 W, 30 W, 45 W, or more. In other embodiments, the maximum power that sub-surface wireless power transmitter 202 is capable of transferring to wireless power receiver 206 may be lower than 10 W, such as 5 W or less.

In some embodiments, the driver 114 of sub-surface wireless power transmitter 202 may be implemented in any way known in the art, such as including a half-bridge or full-bridge, for example.

Figure 3:
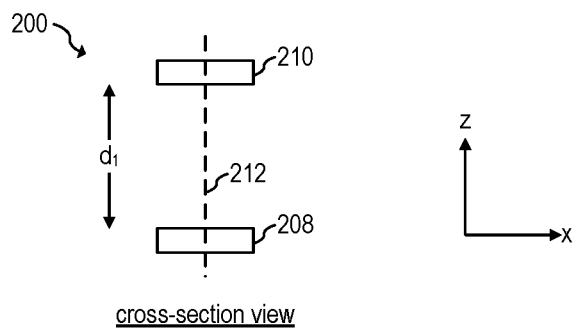
FIG. 3 shows a transmitting coil $L_{TX}$ of the sub-surface wireless power transmitter of FIG. 2 and a receiving coil $L_{RX}$ of the wireless power receiver of FIG. 2, according to an embodiment of the present invention.

In some embodiments, such as in some embodiments implemented as sub-surface wireless sub-surface wireless charging system 200, the coupling coefficient between the transmitting coil $L_{TX}$ of the sub-surface wireless power transmitter 202 and the receiving coil $L_{RX}$ of the wireless power receiver 206 is low, e.g., as a result of distance $d_1$. For example, FIG. 3 shows transmitting coil $L_{TX}$ 208 of sub-surface wireless power transmitter 202 and receiving coil $L_{RX}$ 210 of wireless power receiver 206, according to an embodiment of the present invention. As shown in FIG. 3, coils $L_{TX}$ 208 and $L_{RX}$ 210 have their respective coil centers aligned with centerline 212.

Generally, the larger the distance $d_1$ between transmitting coil 208 and receiving coil 210, the lower the coupling coefficient. For example, generally, for a particular distance $d_1$ and when transmitting coil 208 has its center aligned with centerline 212, the closer the center of receiving coil 210 is to centerline 212, the higher the coupling coefficient. As a non-limiting example, the coupling coefficient between transmitting coil 208 and receiving coil 210 when the centers of transmitting coil $L_{TX}$ 208 and receiving coil $L_{RX}$ 210 are aligned with centerline 112 may be, e.g., about 0.1 when thickness $d_1$ is 20 mm.

Generally, the higher the coupling coefficient, the higher the power transferred from transmitting coil $L_{TX}$ 208 to receiving coil $L_{RX}$ 210. A lower coupling coefficient generally reduces the efficiency of the wireless power transfer as well as the maximum amount of power that can be transferred from sub-surface wireless power transmitter 202 to wireless power receiver 206.

In some embodiments, transmitting coil $L_{TX}$ 208 may be implemented, for example, using Litz wire. Other implementations, such as using printed circuit board (PCB) traces or stamped metal, are also possible.

In some embodiments, receiving coil $L_{RX}$ 206 may be implemented, for example, using Litz wire. Other implementations, such as using single stranded wire, printed circuit board (PCB) traces or stamped metal, are also possible.

In some embodiments, centerline 212 is orthogonal to the winding loops of transmitting coil $L_{TX}$ 208. In some embodiments, centerline 212 is orthogonal to the winding loops of receiving coil $L_{RX}$ 210. In some embodiments, centerline 212 is orthogonal to the winding loops of transmitting coil $L_{TX}$ 208 and of receiving coil $L_{RX}$ 210.

In some embodiments, the relative position of transmitting coil $L_{TX}$ 208 and receiving coil $L_{RX}$ 210 affects the coupling coefficient between transmitting coil $L_{TX}$ 208 and receiving coil $L_{RX}$ 210. In some embodiments, when the coupling coefficient changes between transmitting coil $L_{TX}$ 208 and receiving coil $L_{RX}$ 210, sub-surface wireless power transmitter 202 adjust the amount of power transferred by transmitting coil $L_{TX}$ 208 to compensate for the change in coupling coefficient and, e.g., cause wireless power receiver 206 to keep wirelessly receiving, e.g., constant level of power from sub-surface wireless power transmitter 202.

In some embodiments, sub-surface wireless power transmitter 202 does not move with respect to surface 204 during normal operation. For example, in some embodiments, sub-surface wireless power transmitter 202 is firmly attached (e.g., using glue, screws, etc.) to bottom surface 204b of surface 204. In such embodiments, generally, the closest wireless power receiver 206 and corresponding receiving coil $L_{RX}$ 210 can be to sub-surface wireless power transmitter 202 and corresponding transmitting coil $L_{TX}$ 208 is $d_1$. As such, sub-surface wireless power transmitter 202 may be designed considering the maximum coupling coefficient, which may be low (e.g., 0.1). For example, in some embodiments, sub-surface wireless power transmitter 202 may be designed to wirelessly transfer 10 W to wireless power receiver 206 assuming a coupling coefficient of 0.1.

Safety risks and/or damage risks may arise when sub-surface wireless power transmitter 202 begins wirelessly transmitting power to wireless power receiver 206 when wireless power receiver 206 is closer than $d_1$ to sub-surface wireless power transmitter 202. For example, in some embodiments, sub-surface wireless power transmitter 202 may operate without being attached to surface 204 (such as prior to installation). In such embodiments, wirelessly transmitting power to receiver 206 when wireless power receiver 206 (and receiving coil $L_{RX}$ 210) is very close to transmitting coil $L_{TX}$ 208 (e.g., in contact, or at a distance less than $d_1$) may cause a safety hazard. For example, in an embodiment in which sub-surface wireless power transmitter 202 is designed to wirelessly transmit 10 W of power at a distance $d_1$ of 20 mm, sub-surface wireless power transmitter 20 may transmit substantially higher power to wireless power receiver 202 when the distance $d_1$ is, e.g., 2 mm, since the coupling coefficient may be substantially higher at 2 mm (e.g., higher than 0.5) than at 10 mm (e.g., 0.1 or lower). For example, excessive heat, or a fire, may be caused by wirelessly transmitting excessive power from transmitting coil $L_{TX}$ 208 to receiving coil $L_{RX}$ 210. In some cases, wireless power receiver 206 can be damaged by the stronger field if it is placed too close to the wireless power transmitter 202 during fall wireless power transmission.

Safety risks and/or damage risks may also arise when sub-surface wireless power transmitter 202 and/or wireless power receiver 206 are moved during wireless power transfer. For example, in some embodiments, wireless power transfer is started when wireless power receiver 206 is at a safe distance from sub-surface wireless power transmitter 202 (e.g., such as at a distance $d_1$, or higher). During wireless power transfer, wireless power receiver 206 moves closer to sub-surface wireless power transmitter 202 (e.g., to a distance closer than $d_1$ from sub-surface wireless power transmitter 202).

In an embodiment of the present invention, a sensor for movement detection is implemented with a light sensor directed towards a charging space (e.g., 201). The light sensor is used to detect movement (e.g., of the sub-surface wireless power transmitter and/or the wireless power receiver). When movement is detected, wireless power transfer stops. In some embodiments, when the light sensor is covered (e.g., by a non-transparent surface, such as when the sub-surface wireless power transmitter is installed in a non-transparent surface), the light sensor is disabled and does not interfere with wireless power transfer.

Figure 4A:
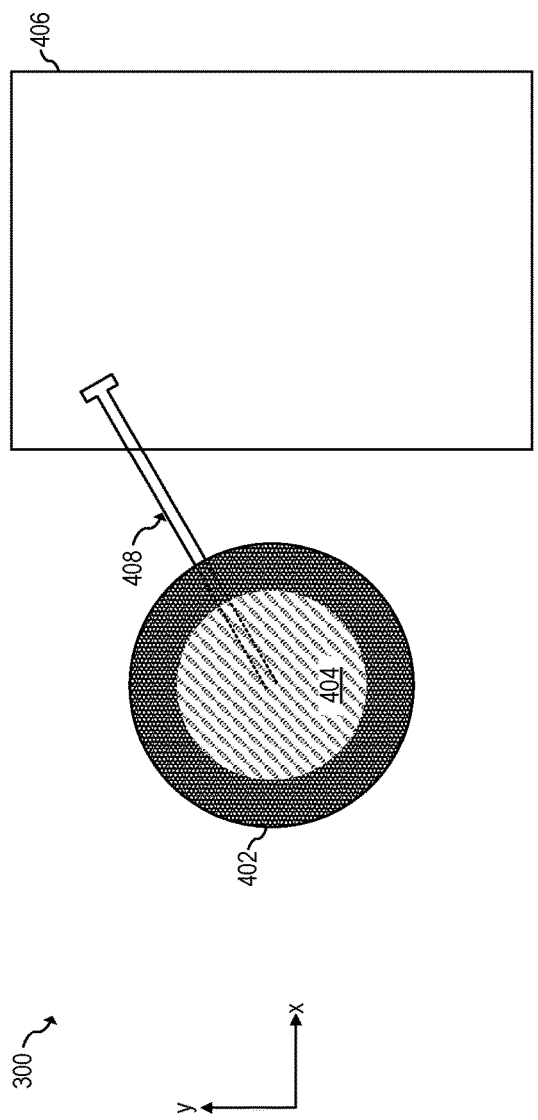
FIG. 4A shows different views of a sub-surface wireless power transmitter, according to an embodiment of the present invention.

In some embodiments, the light sensor is implemented as an infrared (IR) sensor. For example, FIG. 4A shows different views of sub-surface wireless power transmitter 400, according to an embodiment of the present invention. Sub-surface wireless power transmitter 400 includes housing 410, transmitting coil $L_{TX}$ 402, ferrite core 404, PCB 406, controller 450, infrared (IR) sensor 416, and light pipe 408. Housing 410 includes opening 418. Some embodiments also include a heatsink (not show), e.g., in contact with ferrite core 404. Sub-surface wireless power transmitter 202 may be implemented as sub-surface wireless power transmitter 400. Transmitting coil 208 may be implemented as transmitting coil 402.

For clarity purposes, only surface portion 410a of housing 410 (e.g., configured to be in contact with bottom surface 204b) is illustrated in FIG. 4A. In some embodiments, housing 410 surrounds sub-surface wireless power transmitter 400. For example, in some embodiments, housing 410 may include side portions (not shown) and/or a bottom portion (not shown). Although surface portion 410a of surface 410 is illustrated as being planar, other surface shapes, such as non-planar surfaces (e.g., curved), may also be used.

During normal operation, IR sensor 416 transmits IR signals (e.g., light pulses) 412 via light pipe 408 and opening 418, and receives corresponding reflected IR signals 414 via opening 418 and light pipe 408. The intensity of reflected IR signals 414 may be related to the distance of the object (e.g., wireless power receiver 206) that reflects IR signal 412. Such intensity may also depend on the material of the object reflecting IR signal 412, as well as other factors.

When wireless power receiver 406 moves, the intensity of IR signal 314 may change. Such change can be used to determine movement of wireless power receiver 206. By using the change (difference) of the intensity of IR signal 414 rather than the value of the intensity, some embodiments are advantageously capable of detecting movement of wireless power receiver 206 with respect to sub-surface wireless power transmitter 400 without determining the actual distance to wireless power receiver 206 from the tip of light pipe 418. Thus, some embodiments, advantageously achieve accurate movement detection of wireless power receiver 206 with respect to sub-surface wireless power transmitter 400 in a computationally less complex manner, and avoiding complex sensor calibration steps than by calculating actual distance between wireless power receiver 206 and sub-surface wireless power transmitter 400.

Light pipe 408 is configured to guide IR signals and may be implemented in any way known in the art. For example, in some embodiments, light pipe 408 may be made of plastic or optical fiber.

In some embodiments, a single light pipe 408 is used for transmitting and receiving IR signals 412 and 414. In other embodiments, two light pipes are used, one for transmitting IR signals 412 and one for receiving reflected IR signals 414.

The amplifiers used in the IR sensor 416 may be saturated by the presence of the electrical field generated by transmitting coil $L_{TX}$ 402. In some embodiments (e.g., as shown in FIG. 4A), using a light pipe (e.g., 408) may advantageously allow for placement of IR sensor 416 away from transmitting coil $L_{TX}$ 402 to avoid such interference. For example, in some embodiments, IR sensor 416 may be implemented more than 20 mm away from transmitting coil $L_{TX}$ 402 in a direction orthogonal to centerline 212. Other IR sensor placements are also possible.

In some embodiments, a controller (e.g., 450) may be used to control operation of the driver (e.g., 114) of sub-surface wireless power transmitter 400. In some embodiments, controller 450 may also be used to control IR sensor 416.

Controller 450 may be implemented, e.g., as a generic or custom controller or processor that includes, for example, combinatorial circuits coupled to a memory. Other implementations are also possible.

Figure 4A:
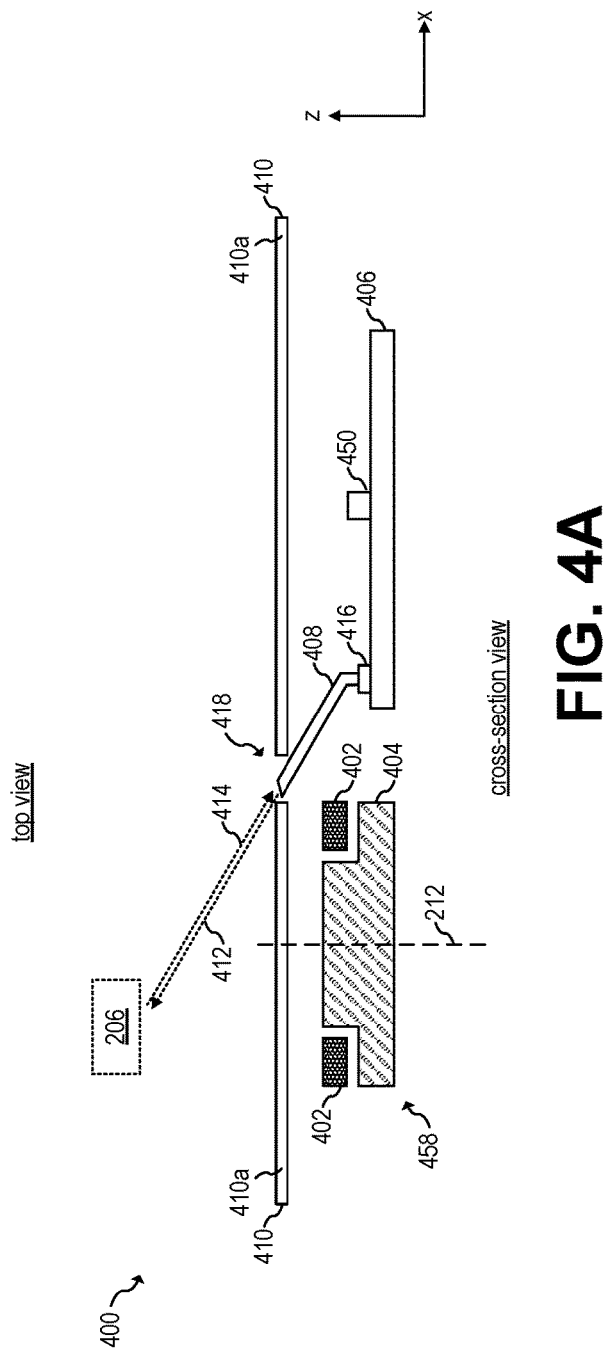
Figure 4B:
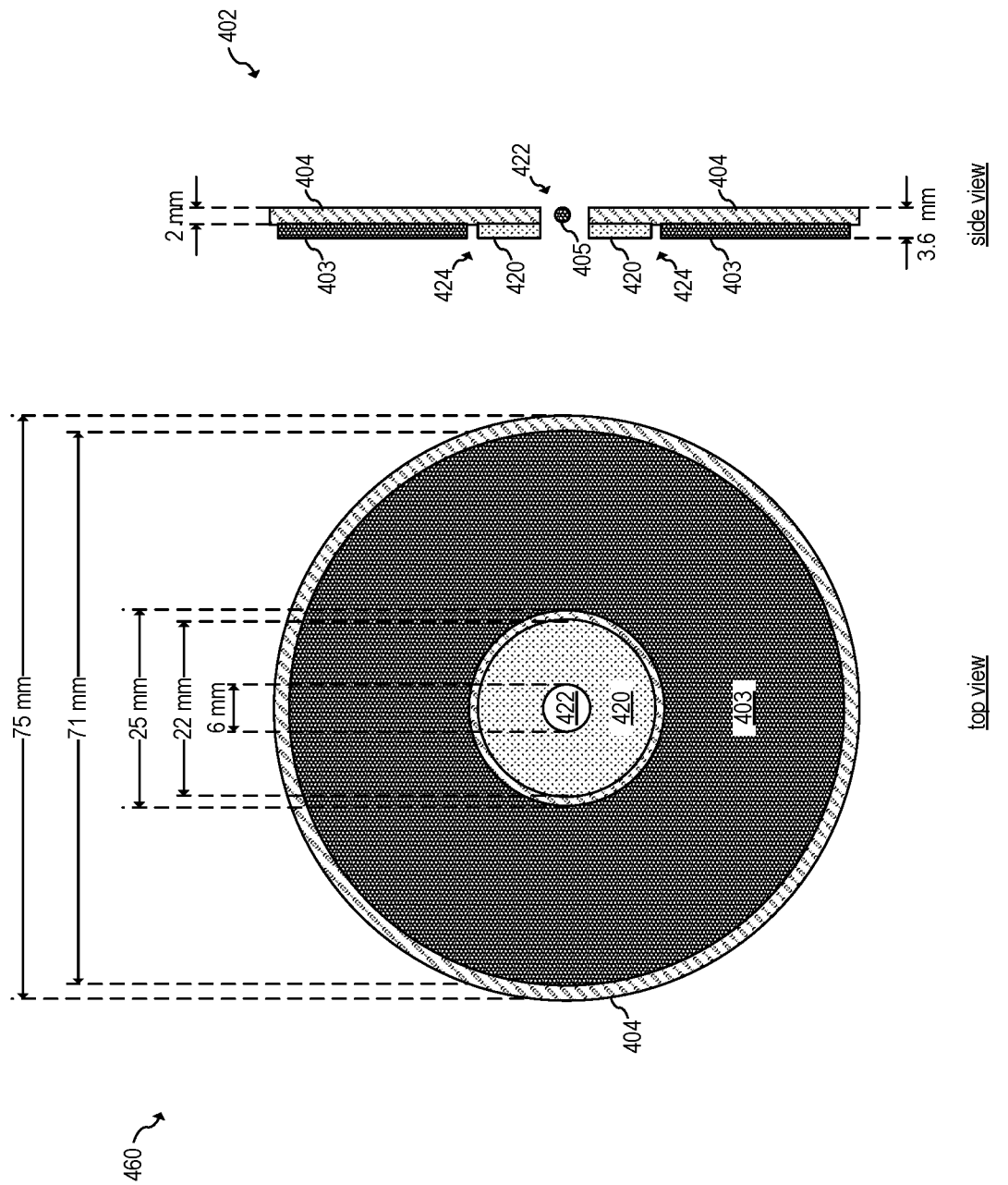
FIG. 4B shows various views of a possible implementation of the transmitting coil of FIG. 4A, according to an embodiment of the present invention.

FIG. 4A shows a possible implementation of a transmitting coil $L_{TX}$. Other implementations are possible. For example, FIG. 4B shows various views of transmitting coil assembly 460 with exemplary dimensions, according to an embodiment of the present invention. Transmitting coil assembly 458 may be implemented as transmitting coil assembly 460. As shown in FIG. 4B, transmitting coil assembly 460 includes windings 403 of transmitting coil $L_{TX}$ 402 having a plurality of turns disposed in ferrite core 404. A center attractor 420 (e.g., with 1.6 mm of thickness) may be disposed around a hole 422. The hole 422 may extend from the top of attractor 420 to the bottom of ferrite 404. Gap 424 between windings 403 and attractor 420 may have a width of 1.5 mm.

Windings 403 may have two return wires (from the two end-points of winding 403). The first return wire may extend from an outer edge of winding 403 outwards (not shown in FIG. 4B). The second return wire may go through hole 422. In some embodiments, the second return wire 405 may go from the center of windings 403 towards the outer edge of windings 403. Other implementations are also possible. It is understood that the first and second return wires may be part of the same wire of winding 403.

In the embodiment of FIG. 4B, transmitting coil $L_{TX}$ 402 is implemented with 14 AWG (1.63 mm diameter) type 2 Litz wire, with 15 turns of 210 strands of no. 40 AWG (0.08 mm). The transmitting coil $L_{TX}$ 402 of FIG. 4B has an inductance of 18.4 pH, series resistance of 50 mΩ at 127 kHz, and a quality factor Q that is greater than 300. Other dimensions and values are also possible. For example, as shown in FIG. 4B, in some embodiments, windings 403 may have an outer diameter of 71 mm, an inner diameter of 25 mm, a thickness of 1.6 mm, and may have 15 turns in a single layer. In some embodiments, windings 403 may have an outer diameter larger than 71 mm, such as 72 mm, or more; or lower than 71 mm, such as 70 mm, or less. In some embodiments, winding 403 may have an inner diameter lower than 25 mm, such as 23.5 mm, 23 mm, 22.5 mm or lower, or higher than 25 mm, such as 26 mm or higher. In some embodiments, windings may have a thickness lower than 1.6 mm, such as 1.4 mm, or lower, or higher, such as 1.8 mm, 2.1 mm, or higher. In some embodiments, windings may have more than 15 turns (e.g., 16 turns, or more) or less than 15 turns (e.g., 14 turns, or less). In some embodiments, windings 403 may be implemented in more than 1 layer.

As shown in FIG. 4B, ferrite core 404 may have an outer diameter of 75 mm. In some embodiments, may have an outer diameter of more than 75 mm, such as 76 mm or more, or less than 75 mm, such as 74 mm or less.

As shown in FIG. 4B, in some embodiments, center attractor 422 may have an outer diameter of 22 mm, a thickness of 1.6 mm and a gap between the center attractor 420 and windings 403 of 1.5 mm. In some embodiments, center attractor 420 may have an outer diameter larger than 22 mm, such as 22.5 mm or more, or smaller than 22 mm, such as 21.5 mm or less. In some embodiments, center attractor may have a thickness lower than 1.6 mm, such as 1.4 mm, or less, or higher than 1.6 mm, such as 1.7 mm, 1.85 mm, or more. In some embodiments, the gap between center attractor 420 and windings may be lower than 1.5 mm, such as 1 mm, 0.5 mm, or less, including 0 mm (attractor 420 being in contact with winding 403), or higher than 1.5 mm, such as 1.6 mm, or more.

In some embodiments, such as in the embodiment of FIG. 4B, transmitting coil $L_{TX}$ 402 may be designed to wirelessly transmit 5 W of power through a surface 204 having a thickness ($d_1$) of 21 mm. In some embodiments, the thickness $d_1$ of the surface may be larger than 21 mm, such as 21.5 mm, 22 mm, 22.5 mm, 25 mm, 30 mm or more, or smaller than 21 mm, such as 20.5 mm, 20 mm, or lower. In some embodiments, transmitting coil $L_{TX}$ 402 may be designed to wirelessly transmit more than 5 W of power through a surface 204, such as 7.5 W, 10 W, or more, or less than 5 W of power, such as 4.5 W, 4 W, or less.

In some embodiments, the housing 410 of the sub-surface wireless power transmitter 400 extends at least 5 mm beyond the outer diameter of the windings 403.

As shown in FIG. 4A, in some embodiments, a transmitting coil assembly (e.g., 458) may include a ferrite core 404 without a hole 422. As shown in FIG. 4A, in some embodiments, attractor 420 may not be implemented in the transmitting coil assembly and ferrite core 420 may extend towards the gap between the windings of coil 402. Other implementations are also possible.

Attractor 420 is configured to guide the magnetic field generated by transmitting coil 402. Attractor 420 may be implemented with the same material as ferrite core 404. As shown in FIG. 4B, in some embodiments, attractor 420 may have a disc shape. In some embodiments, attractor 420 and ferrite core 404 are a single piece, such as in FIG. 4A. In some embodiments, attractor 420 may be attached to ferrite core 404 (e.g., using glue or dual-sided tape), such as shown in FIG. 4B. Other implementations are also possible.

Figure 5:
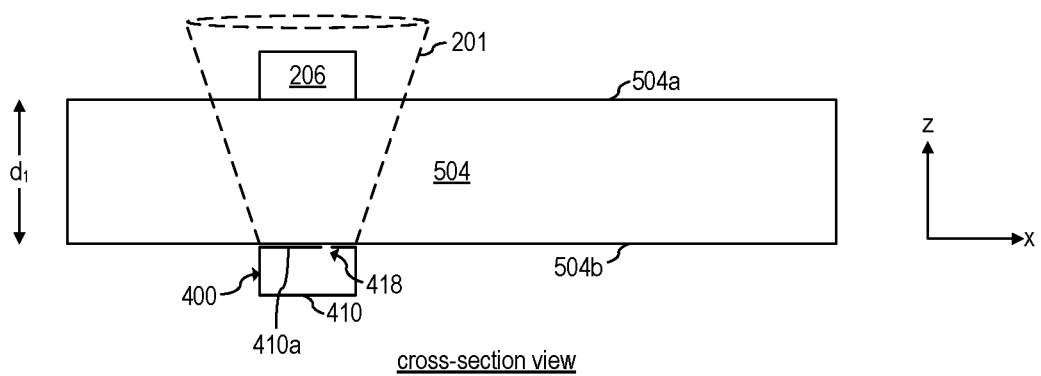
FIG. 5 shows an example of the sub-surface wireless power transmitter of FIG. 4A installed in a non-transparent surface, according to an embodiment of the present invention.

In some embodiments, when sub-surface wireless power transmitter 400 is installed, opening 418 is covered by surface 204. In embodiments in which surface 204 is a non-transparent surface, installing sub-surface wireless power transmitter 400 may advantageously automatically disable IR sensor 416. For example, FIG. 5 shows an example of sub-surface wireless power transmitter 400 installed in non-transparent surface 504, according to an embodiment of the present invention. Surface 204 may be implemented as surface 504.

As shown in FIG. 5, bottom surface 504b of non-transparent surface 504 covers, opening 418 when sub-surface wireless power transmitter 400 is installed. Thus, bottom surface 504b reflects all IR signals 412 transmitted by IR sensor 416. Since all IR signals 412 are reflected by surface 504b, no change in IR intensity is detected. Thus, some embodiments advantageously automatically prevent IR sensor 416 from disabling or otherwise interfering with wireless power transfer when sub-surface wireless power transmitter 400 is installed in a non-transparent surface (e.g., 504).

Figure 6:
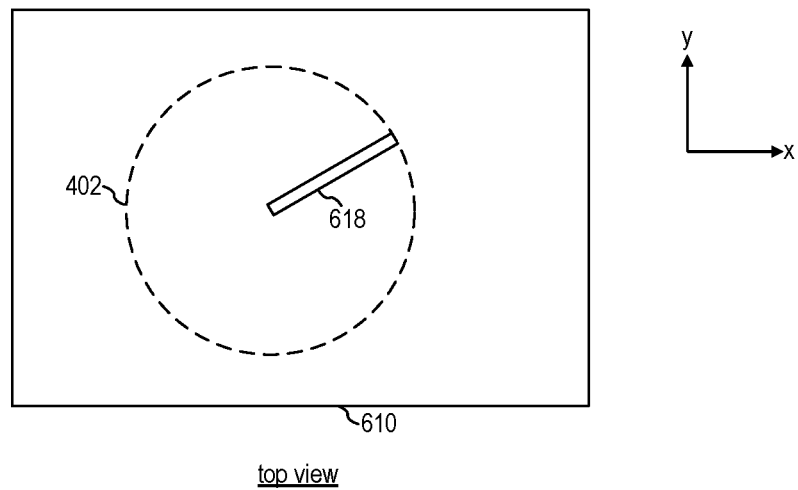
FIG. 6 shows a possible implementation of the housing of FIG. 4 having opening milled as a trench, according to an embodiment of the present invention.

In some embodiments, opening 418 may be implemented as a trench milled on housing 410. For example, FIG. 6 shows housing 610, according to an embodiment of the present invention. Housing 410 may be implemented as housing 610, and opening 418 may be implemented as opening 618.

As shown in FIG. 6, housing 610 has an opening 618 that is milled as a trench. By implementing opening 618 as a trench (e.g., as shown in FIG. 6), some embodiments advantageously achieve better IR light 412 projection towards charging space 201 when compared to circular openings. Opening 418 may be implemented in other ways.

Figure 7:
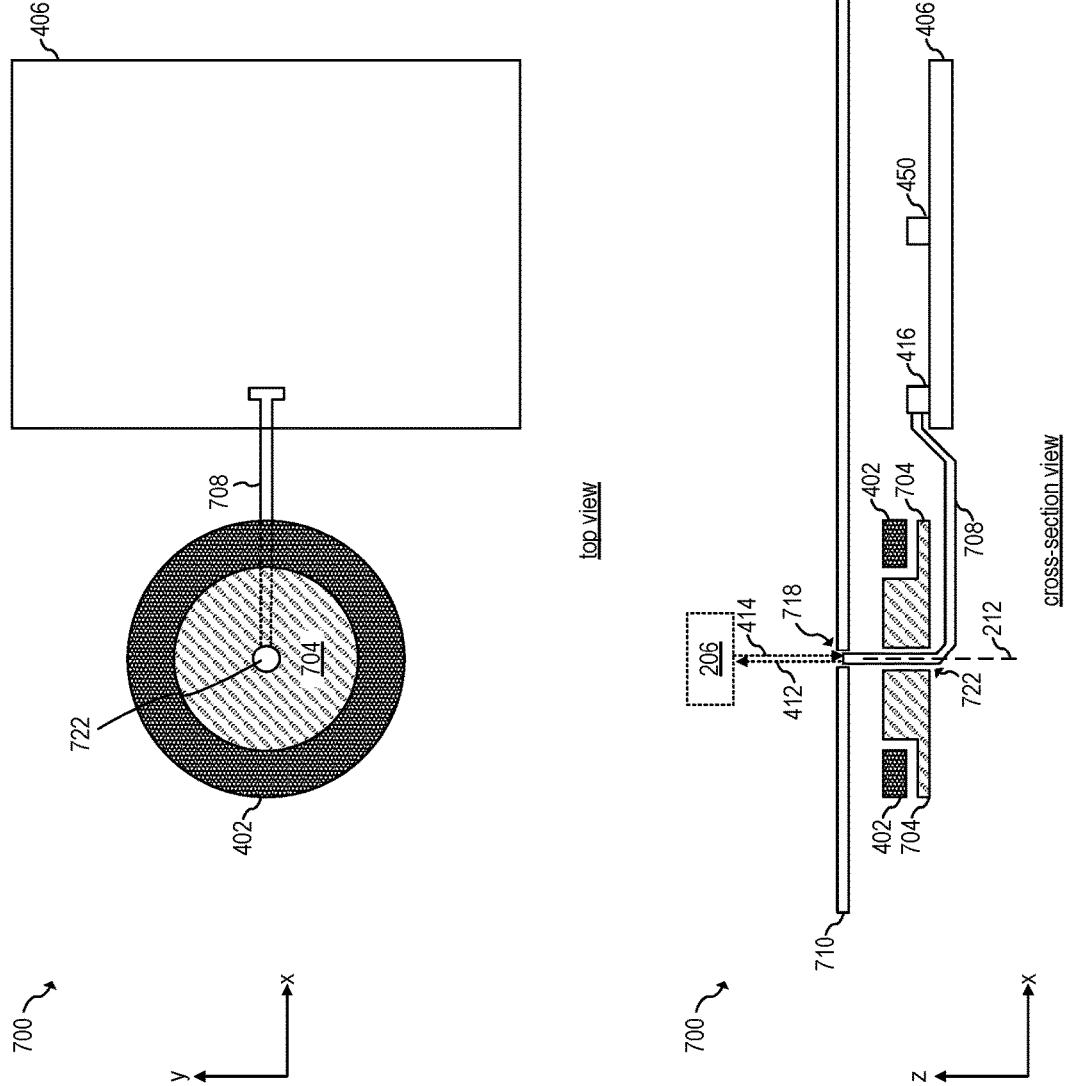
FIG. 7 shows different views of a sub-surface wireless power transmitter, according to an embodiment of the present invention.

As shown in FIG. 4A, IR sensor 416 and light pipe 408 may be implemented such that light pipe 408 is placed on the side of transmitting coil $L_{TX}$ 402 and projects IR light (412) at an oblique angle with respect to centerline 212 towards charging space 201. Other implementations are also possible. For example, FIG. 7 shows different views of sub-surface wireless power transmitter 700, according to an embodiment of the present invention. Sub-surface wireless power transmitter 102 may be implemented as sub-surface wireless power transmitter 700. Sub-surface wireless power transmitter 700 includes housing 710, transmitting coil $L_{TX}$ 402, ferrite core 704, PCB 406, IR sensor 416, and light pipe 708. Housing 710 includes opening 718. Sub-surface wireless power transmitter 700 operates in a similar manner as sub-surface wireless power transmitter 400.

As shown in FIG. 7, a hole 722 may be used to route light pipe 708 so that IR light 412 is projected in a direction parallel to centerline 212 and from the center of transmitting coil $L_{TX}$ 402. By projecting the IR light 412 from the center of transmitting coil $L_{TX}$ 402, some embodiments are advantageously capable of detecting movement at distances farther from housing 710, when compared to implementations that project IR light with an oblique angle with respect to centerline 212.

Figure 8:
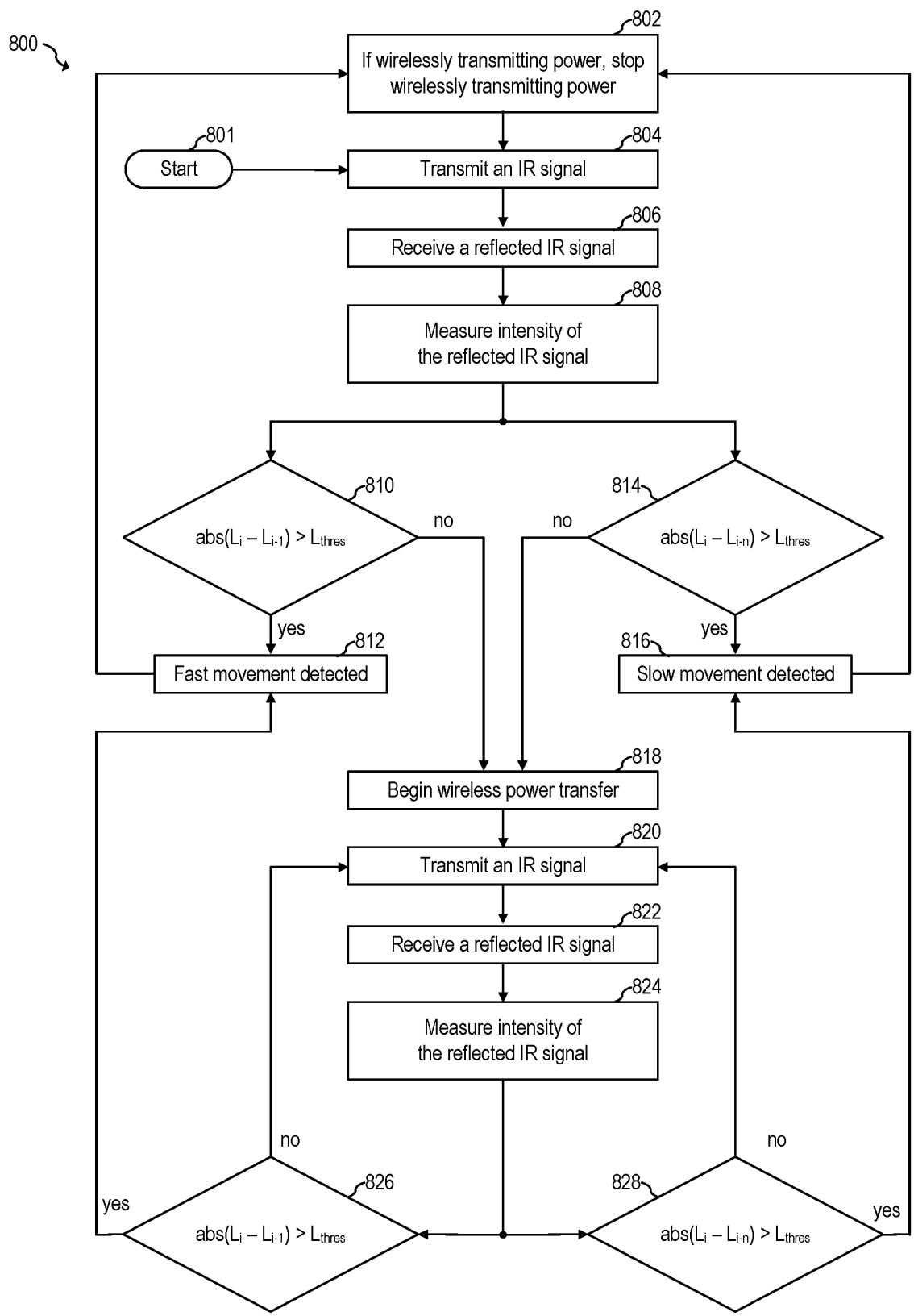
FIG. 8 shows a flow chart of an embodiment method 800 for detecting movement of a wireless power receiver with respect to a sub-surface wireless power transmitter, according to an embodiment of the present invention.

In some embodiments, movement of a wireless power receiver (e.g., 106, 206) with respect to a sub-surface wireless power transmitter (e.g., 202, 400, 700) is detected based on slow motion as well as fast motion. For example, FIG. 8 shows a flow chart of embodiment method 800 for detecting movement of a wireless power receiver (e.g., 106, 206) with respect to a sub-surface wireless power transmitter (e.g., 202, 400, 700), according to an embodiment of the present invention. Method 800 may be implemented, in part, by controller 450.

As shown in FIG. 8, steps 804, 806, 808, 810 and 814 are performed before wireless power transfer begins.

During step 804, IR light (e.g., 412) are transmitting from an IR sensor (e.g., 416) towards a charging space (e.g., 201). During step 806, reflected IR light (e.g., 414) is received by the IR sensor. During step 808, the intensity L of the reflected IR light is determined using the IR sensor, e.g., using conventional methods.

Steps 804, 806, and 808 are repeated (e.g., periodically). For example, in some embodiments, the intensity L of the reflected IR light is determined every, e.g., 10 ms. Other time intervals, such as longer than to ms (e.g., 20 ms, 50 ms, or longer) or shorter than 10 ms (e.g., 8 ms, 5 ms, 1 ms, or shorter) may also be used.

During step 810, the difference between the intensity $L_i$ measured at time step i (e.g., the current time step) of the reflected IR light and the previous measurement of IR light intensity $L_{i-1}$ (measured at the previous time step i−1) is compared with a predetermined threshold $L_{thres}$. If the difference is higher than the threshold $L_{thres}$, then a fast movement is detected during step 812 (such as when wireless power receiver 206 falls towards surface 204a).

During step 814, the measured light intensity $L_i$ is compared to the measured intensity $L_{i+n}$ of reflected IR light received n time steps before time step i. If the difference between $L_i$ and $L_{i+n}$ is greater than the predetermined threshold $L_{thres}$, then a slow movement is detected during step 816.

In some embodiments, if either a fast movement is detected (during step 810) or a slow movement is detected (during step 814), wireless power transfer does not begin.

As a non-limiting example, in an embodiment, n is equal to 10, and each measurement occurs every 10 ms. In such embodiment, every 10 ms, a measurement of IR light intensity $L_i$ is taken. Such measurement is compared with the measurement taken 10 ms before (during step 810), and too ms before (during step 814). If the difference in intensities between the intensity at time step i and either the intensity 10 ms before or too ms before is greater than the predetermined threshold $L_{thres}$, then wireless power transfer does not begin. A possible implementation of such scheme may use a circular buffer.

In some embodiments, steps 810 and 814 may be performed concurrently.

As shown in FIG. 8, in some embodiments, the predetermined threshold $L_{thres}$ used during steps 810 and 814 (and during steps 826 and 828) is the same. In other embodiments, the predetermined threshold used for fast movement detection (during steps 810 and 826) is different than the predetermined threshold used during slow movement detection (during steps 814 and 828).

In some embodiments, step 814 may be performed based on an average intensity of previous intensities. For example, in some embodiments, the difference of $L_i$ and the average of $L_{i-1-n}$, $L_{i+n}$, and $L_{i+n+1}$, is compared with the predetermined threshold $L_{thres}$ during step 814. Other implementations are also possible.

If no movement is detected during steps 810 and 814, then wireless power transfer begins during step 818 from the sub-surface wireless power transmitter to the wireless power receiver. Steps 820, 822, 824, 826, and 828 are performed in a similar manner as steps 804, 806, 808, 810, and 814. In some embodiments, if either slow or fast movement is detected during steps 826 or 828, the wireless power transfer stops (step 802).

In some embodiments, actions taken during step 802 as a result of fast movement detection (steps 810, 826) may be different from actions taken during step 802 during slow movement detection (steps 812, 828). For example, in some embodiments, fast movement detection may cause the stopping of wireless power transmission while slow movement detection may cause a reduction of power level transmitted by the sub-surface wireless power transmitter.

By monitoring movement using an IR sensor, some embodiments advantageously prevent or stop wireless power transfer when the wireless power receiver is too close to the sub-surface wireless power transmitter, which may advantageously prevent a hazardous condition, such as excessive heating, or electrical damage of the wireless power receiver.

It can be seen in FIG. 8 that when sub-surface wireless power transmitter such as 400 or 700 is installed in a non-transparent surface, the results from steps 810, 814, 826, and 828 is "no," thereby allowing for normal wireless power transfer even when method 800 continues to be performed. By continuing to perform method 800 after installation of the sub-surface wireless power transmitter, some embodiments advantageously prevent hazardous condition, such as excessive heating, or electrical damage of the wireless power receiver when the sub-surface wireless power transmitter is detached from the non-transparent surface.

In some embodiments, the sub-surface wireless power transmitter (e.g., 400, 700) may be installed on a transparent or semi-transparent surface. In such embodiments, after installation of the sub-surface wireless power transmitter into the transparent or semi-transparent surface, the result from steps 810, 814, 826 or 828 may be "yes," which may cause wireless power transfer to not begin or to stop if the wireless power receiver is moved before or during wireless power transfer. Such behavior may be desirable in some implementations. For example, in some embodiments, the IR sensor is continuously measuring the light intensity. If movement is detected, wireless power transfer stops. However, once movement is no longer detected (e.g., after m time steps, if the receiver stopped moving), then wireless power transfer resumes.

In some embodiments, m may be 10 or greater, such as 50. In some embodiments, m time steps correspond to a time interval between 1 s to 5 s. Other time intervals may be used.

In some embodiments, the results of steps 810, 814, 826 and 828 are ignored if the current measurement is below a second predetermined threshold (since a low intensity of light may be related to the wireless power receiver being far from the charging surface (204a, 504a).

In some embodiments relying on an IR sensor (e.g., 416) for movement detection, the IR sensor may stop working if covered by an object. For example, if the opening (e.g., 418, 718) of the housing of the sub-surface wireless power transmitter (e.g., 400, 700) is covered, e.g., by a napkin or a piece of fabric, method 800 may be ineffective for detecting motion. In some embodiments, movement of a wireless power receiver with respect to a sub-surface wireless power transmitter is detected by using differential coils during wireless power transfer. In some embodiments, opposite, differential "pizza-slice"-type of coils are used to detect X-Y placement and/or movement of the wireless power receiver with respect to a sub-surface wireless power transmitter. In some embodiments, concentric coils are used to detect Z placement and/or movement of the wireless power receiver with respect to a sub-surface wireless power transmitter. In some embodiments, both differential "pizza-slice"-type of coils and concentric differential coils are used to detect position and/or movement of a wireless power receiver with respect to a sub-surface wireless power transmitter in a 3-dimensional (3D) space.

In some embodiments, wireless power transmission may be stopped or reduced in intensity as a result of placement detection (e.g., misplacement of the wireless power receiver in the X-Y plane with respect to centerline 212) or movement detection. In some embodiments, foreign object detection (FOD) may be adjusted based on placement detection and/or movement detection.

Figure 9A:
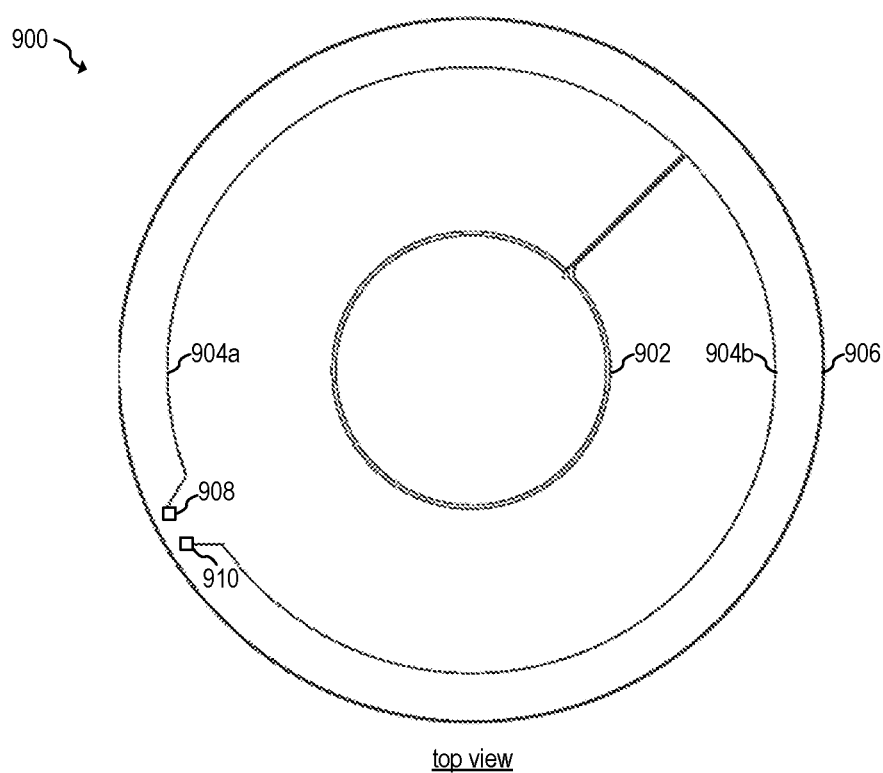
FIGS. 9A and 9B show a top view and schematic diagram, respectively, of concentric differential coils, according to an embodiment of the present invention.
Figure 9B:
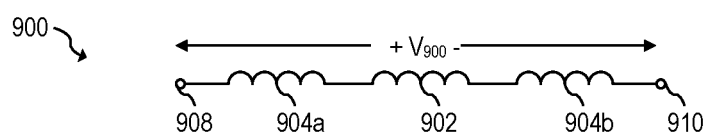

FIGS. 9A and 9B show a top view and schematic diagram, respectively, of concentric differential coils 902 and 904, according to an embodiment of the present invention. As shown in FIG. 9A, coils 902 and 904 may be implemented in PCB 906. Coils 902 and 904 may be referred to as sensing coils 902 and 904, and PCB 906 may be referred to as sensing PCB 906.

As shown in FIG. 9A, in some embodiments, inner coil 902 has two turns while outer coil 904 has a single turn. In some embodiments, a different number of turns may also be used.

In some embodiments, PCB 906 is a flex PCB. Other implementations are also possible.

As shown in FIGS. 9A and 9B, sensing coils 902 and 904 are connected in series, in which a first portion 904a of coil 904 is connected between terminal 908 and coil 902, and a second portion 904b of coil 904 is connected between terminal 910 and coil 902. In some embodiments, other connection points may be used.

In some embodiments, the inductance of coil 902 and the inductance of coil 904 (which includes both the first 904a and second 904b portions of coil 904) have the same inductance ($L_{902}=L_{904}$). In some embodiments, coils 902 and 904 are connected such that their respective currents flow in opposite direction (e.g., clockwise for coil 902 and counter-clockwise for coil 904) such that the voltage ($V_{900}$) between terminals 908 and 910 is 0 V when a uniform magnetic field flows, e.g., through the center of the concentric coils 902 and 904.

When the magnetic field flowing through coils 902 and 904 changes (e.g., when the magnetic field is perturbed by the presence of a wireless power receiver), the voltage $V_{900}$ between terminals 908 and 910 may change. Such voltage change $\Delta V_{900}$ may be used to detect movement of a wireless power receiver with respect to PCB 906.

Voltage $V_{900}$ between terminals 908 and 910 may be measured in any conventional manner. For example, in some embodiments, a differential amplifier may be used to determine voltage $V_{900}$. In some embodiments, an analog-to-digital converter (ADC) may be used to sample the voltage at terminals 908 and 910 or at the output of the differential amplifier to determine voltage $V_{900}$. Other implementations are also possible.

As shown in FIG. 9A, PCB 906 may have a shape that follows the shape of the coils 902 and 904, such as a circular shape. Other shapes, such as rectangular shapes, other symmetrical shapes, and non-symmetrical shapes, may also be used.

Figure 10:
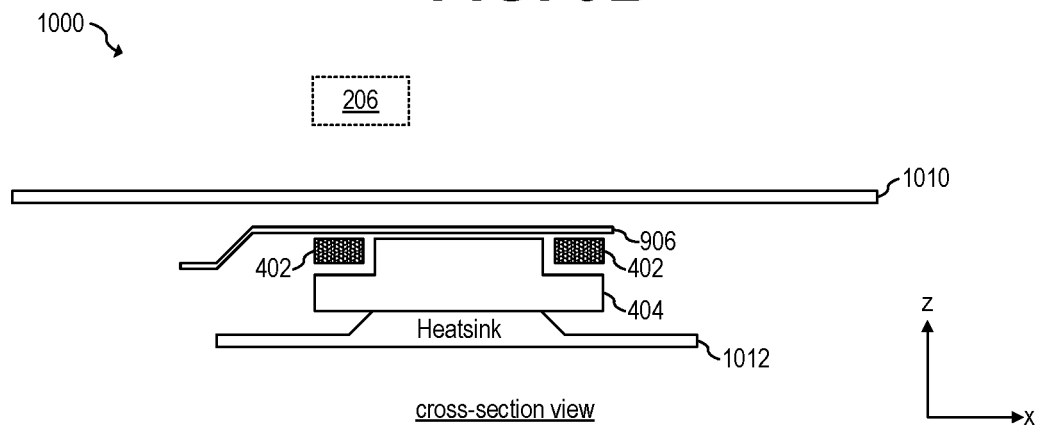
FIG. 10 shows a cross-section view of a sub-surface wireless power transmitter, according to an embodiment of the present invention.

In some embodiments, PCB 906 may be disposed between a transmitting coil $L_{TX}$ (e.g., 402) and a housing (e.g., 410, 610, 710) of a sub-surface wireless power transmitter and the voltage $V_{900}$ between terminals 908 and 910 may be used to detect movement of a wireless power receiver with respect to the sub-surface wireless power transmitter. For example, FIG. 10 shows a cross-section view of sub-surface wireless power transmitter 1000, according to an embodiment of the present invention. Sub-surface wireless power transmitter 202 may be implemented as sub-surface wireless power transmitter 1000. A sub-surface wireless power transmitter using an IR sensor (e.g., 416), such as sub-surface wireless power transmitters 400 and 700, may be modified to include PCB 906 between the transmitting coil $L_{TX}$ 402 and the housing (e.g., 410, 610, 710).

Sub-surface wireless power transmitter 1000 includes housing 1010, transmitting coil $L_{TX}$ 402, ferrite core 404, heatsink 1012, and PCB 906 implemented as a flex PCB. Other transmitting coil assemblies may also be used.

When wireless power receiver 206 is present in the charging field 201, during wireless power transfer from sub-surface wireless power transmitter 1000 to wireless power receiver 206, the voltage between terminals 908 and 910 of sensing PCB 906 may become different than 0 V (e.g., between 1V and 3 V). For example, in some embodiments, the closer wireless power receiver 206 is to sensing PCB 906, the higher the voltage between terminals 908 and 910.

Figures 11, 14:
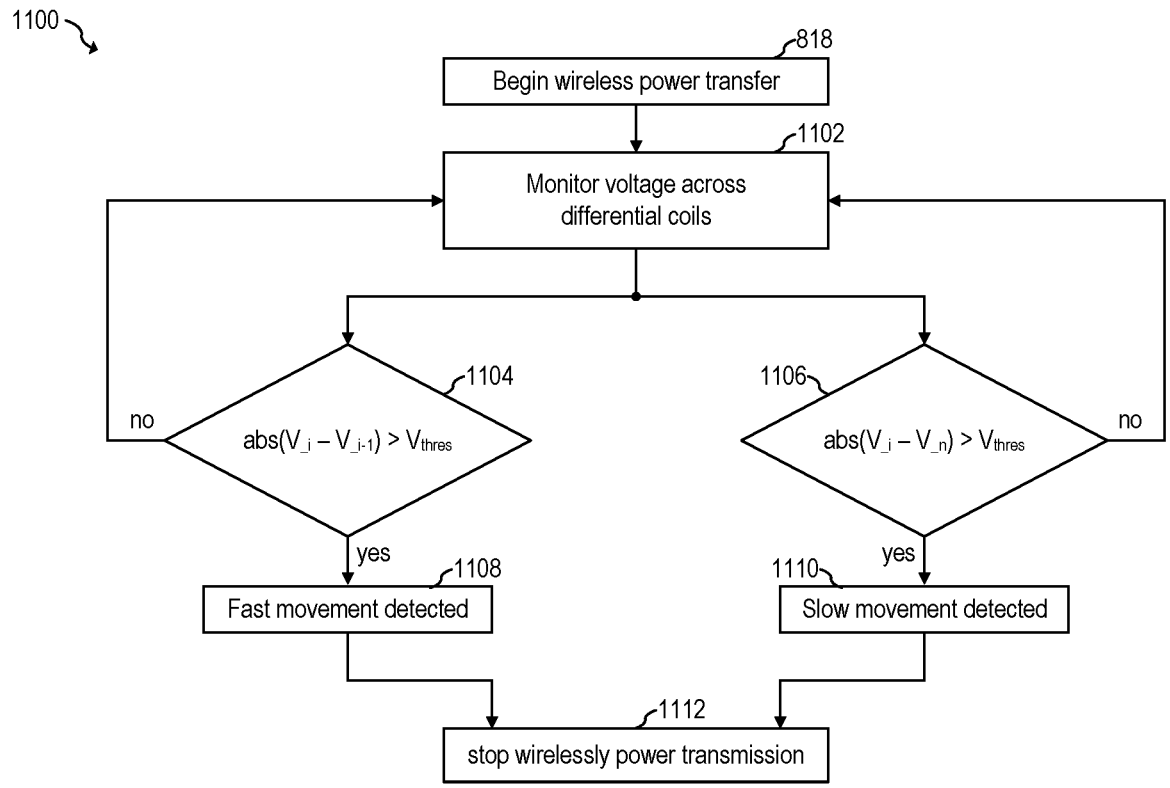
FIG. 11 shows a flow chart of an embodiment method for detecting movement of a wireless power receiver with respect to a sub-surface wireless power transmitter, according to an embodiment of the present invention.
FIG. 14 shows table illustrating an embodiment method for estimating a size of a wireless power receiver based on movement detection, according to an embodiment of the present invention.

Although the magnitude of the voltage $V_{900}$ between terminals 908 and 910 may be affected by various factors, such as receiving coil $L_{RX}$ 210 size, X-Y placement of the receiving coil $L_{RX}$ 210 with respect to centerline 212, amount of power being wirelessly transmitted from sub-surface wireless power transmitter 1000, etc., the difference $\Delta V_{900}$ between voltages from $V_{900}$ samples taken at different times (e.g., every 10 ms) can be used to detect motion. For example, FIG. 11 shows a flow chart of embodiment method 1100 for detecting movement of a wireless power receiver with respect to a sub-surface wireless power transmitter, according to an embodiment of the present invention. Method 1100 may be implemented, in part, by controller 450. [out] The description of method 1100 assumes an implementation with concentric coils, such as shown in FIG. 9A. Concentric coils may be sensitive to movement in the Z axis. As will be described in more detailed later, method 1100 may be performed using other types of sensing coils, such as "pizza-slice"-type coils. Pizza-slice-type coils may be sensitive to movement in the X or Y axis.

During step 818, wireless power transfer begins from a sub-surface wireless power transmitter (e.g., 400, 700, 1000) to a wireless power receiver (e.g., 206). During wireless power transfer, the voltage $V_{900}$ between output terminals 908 and 910 of a sensing PCB (906) is monitored during step 1102. In some embodiments, such monitoring may begin during application of power signals to detect and identify a wireless power receiver, such as during digital pings according to a Qi standard (e.g., version 1.2.3).

During step 1104, the difference $\Delta V_{900\_i\_-1}$ between the voltage $V_{900\_i}$ measured at time step i and the previous voltage measurement $V_{900\_i-1}$ measured at time step i−1 is compared with a predetermined threshold $V_{thres}$. If the difference $\Delta V_{900\_i\_-1}$ is higher than the threshold $V_{thres}$, then a fast movement is detected during step 1108 (such as when wireless power receiver 206 falls towards surface 204a).

During step 1106, the voltage $V_{900\_i}$ measured at time step i is compared to the voltage $V_{900\_i-n}$ measured n time steps before time step i. If the difference $\Delta V_{900\_i-n}$ between $V_{900\_i}$ and $V_{900\_i-n}$ is greater than the predetermined threshold $V_{thres}$, then a slow movement is detected during step 1110. If either a fast or slow motion is detected (during steps 1108 or 1110), then wireless power transmission stops during step 1112.

As a non-limiting example, in an embodiment, n is equal to 10, and each measurement occurs every 10 ms. In such embodiment, every 10 ms, a voltage measurement $V_{900\_i}$ is taken, and such measurement is compared with the measurement taken 10 ms before ($\Delta V_{900\_i\_i-1}$) (during step 1104), and too ms before ($\Delta V_{900\_i\_1-n}$) (during step 1106). If any of the voltage differences $\Delta V_{900\_i\_i-1}$ and $\Delta V_{900\_i\_i-n}$ is greater than the predetermined threshold $V_{thres}$, then wireless power transfer stops (during step 1112).

In some embodiments, actions other than stopping wireless power transmission may be performed during step 1112. For example, in some embodiments, the power level transmitted by the sub-surface wireless power transmitter may be reduced (but not stopped) during step 1112.

In some embodiments, during step 1112, a foreign object detection (FOD) threshold may be adjusted based on movement detection. For example, in some embodiments, if it is determined that wireless power receiver 602 is misplaced, the FOD threshold may be increased to account for extra loses in metal areas of the wireless power receiver (friendly metal losses).

In some embodiments, actions taken during step 1112 as a result of fast movement detection (step 1108) may be different from actions taken during step 1112 during slow movement detection (step 1110). For example, in some embodiments, fast movement detection may cause the stopping of wireless power transmission while slow movement detection may cause a reduction of power level transmitted by the sub-surface wireless power transmitter.

In some embodiments, steps 1104 and 1106 may be performed concurrently.

As shown in FIG. 11, in some embodiments, the predetermined threshold $V_{thres}$ used during steps 1104 and 1106 is the same. In other embodiments, the predetermined threshold used for fast movement detection (during step 1104) is different than the predetermined threshold used during slow movement detection (during step 1106).

In some embodiments, step 1106 may be performed based on an average voltage of previous measured voltages $V_{900}$. For example, in some embodiments, the difference between $V900\_i$ and the average of $V_{900\_i-1-n}$, $V_{900\_i-n}$, and $V_{900\_i-n+1}$, is compared with the predetermined threshold $L_{thres}$ during step 1106. Other implementations are also possible.

In some embodiments, the threshold $V_{thres}$ dynamically changes, e.g., each time step. For example, in some embodiments, the threshold $V_{thres}$ may be given by $$V_{thres} = k \cdot \mathrm{abs}(V_{900\_i}) \tag{1}$$

where abs( ) represents the absolute value function (e.g., of the peak amplitude or peak-to-peak amplitude of $V_{900\_i}$), $V_{900\_i}$ is the voltage measured at the current time step i, and k represents a factor (e.g., between 0 and 1). In some embodiments, k is a fixed percentage, such as 10%, 15% or higher, or 9%, 8%, or lower.

In some embodiments, factor k is not fixed. For example, in some embodiments, factor k based on how far is the wireless power receiver 206 from transmitting coil $L_{TX}$ (208, 402). For example, in some embodiments, factor k is linearly related to the distance of wireless power receiver 206 from the transmitting coil $L_{TX}$. For example, if receiver 206 is far from transmitting coil $L_{TX}$, then k is higher than if the wireless power receiver 206 is closer to transmitting coil $L_{TX}$. Since the distance between wireless power receiver 206 and the transmitting coil $L_{TX}$ may be (e.g., linearly) related to the voltage $V_{900}$, in some embodiments, factor k is based on voltage $V_{900}$, and may be given by $$k = q \cdot \mathrm{abs}(V_{900\_i}) \tag{2}$$

where q represents a scaling factor.

In some embodiments, the relationship between $V_{thres}$ and how far wireless power receiver 206 is from the transmitting coil $L_{TX}$ is non-linear. For example, in some embodiments, $V_{thres}$ may have a first fixed value when wireless power receiver 206 is at a threshold distance or higher from transmitting coil $L_{TX}$, and may have a second fixed value when the wireless power receiver 206 is closer than the threshold distance to transmitting coil $L_{TX}$, where the second fixed value is higher than the first fixed value. For example, in some embodiments, the threshold $V_{thres}$ may be given by $$V_{thres} = \begin{cases} k_1 \cdot \mathrm{abs}(V_{900\_i}) \to V_{900\_i} \geq V_{900\_thres} \\ k_2 \cdot \mathrm{abs}(V_{900\_i}) \to V_{900\_i} < V_{900\_thres} \end{cases} \tag{3}$$

where $V_{900\_thres}$ is a threshold voltage, and $k_1$ and $k_2$ are fixed factors between 0 and 1, where $k_1 < k_2$.

In some embodiments, the threshold $V_{thres}$ may be given by $$V_{thres} = \begin{cases} V_1 \to V_{900\_i} \geq V_{900\_thres} \\ V_2 \to V_{900\_i} < V_{900\_thres} \end{cases} \tag{4}$$

where $V_1$ and $V_2$ are fixed voltages and $V_1 < V_2$. $V_{thres}$ may be determined in other ways.

Some embodiments may simultaneously implement methods 800 and 1100.

Figure 12:
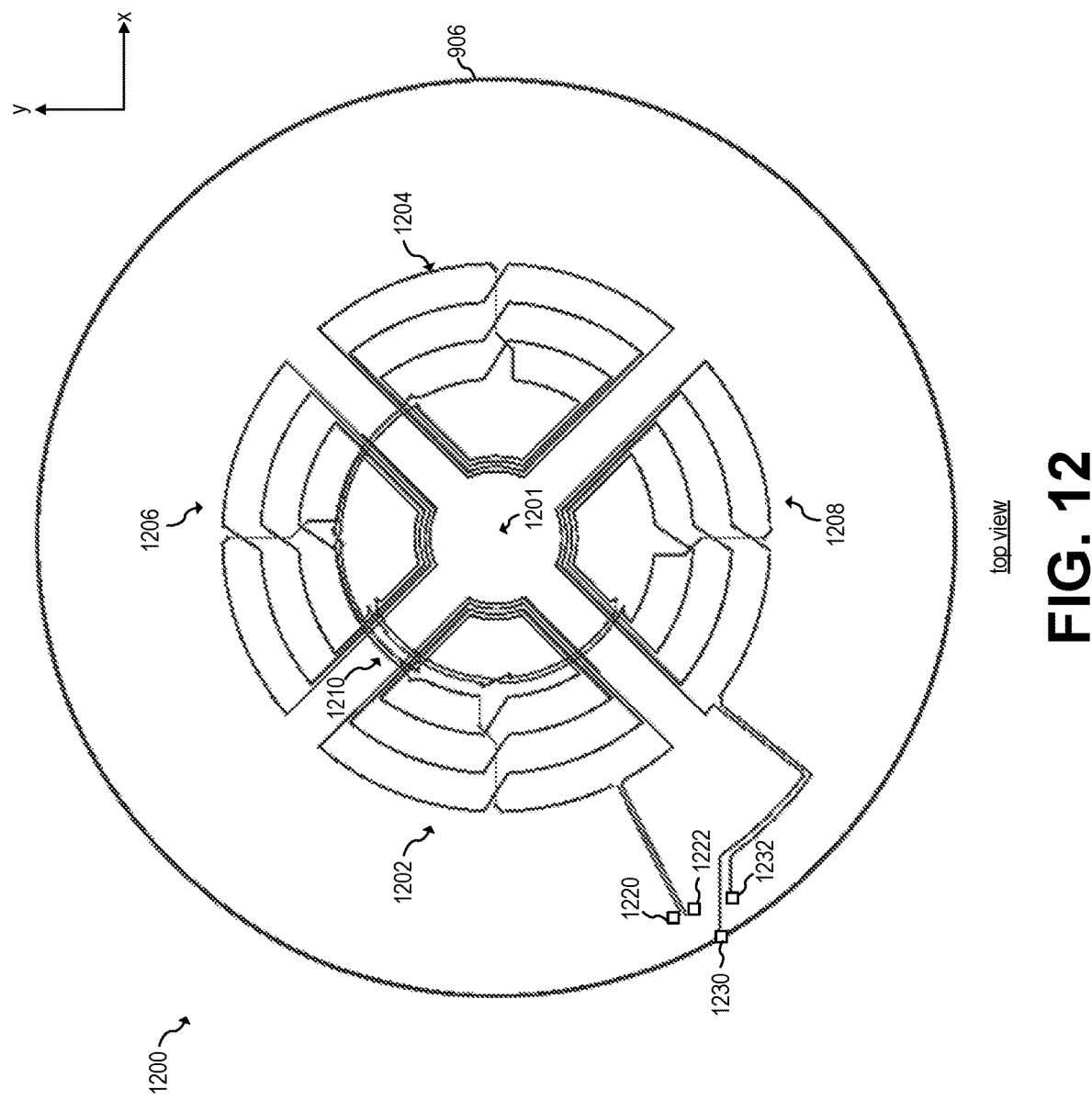
FIGS. 12 and 13 show top views of differential "pizza-slice" type coils, according to embodiments of the present invention.

Movement detection may be performed with "pizza-slice"-type of coils. For example, FIG. 12 shows a top view of differential "pizza-slice" type coils 1200, according to an embodiment of the present invention. Coils 1200 are configured to detect movement in the X-Y plane. Coils 1200 include differential coils 1202, 1204 for movement detection in the x-axis, and differential coils 1206, and 1208, for movement detection in the y-axis.

In a similar manner as concentric coils 900, coils 1202 and 1204 are connected in series, thereby producing 0 V between terminals 1220 and 1222 when wireless power receiver 206 is centered with respect to the x-axis. During wireless power transfer, method 1100 can be used to determine movement and/or placement in the x axis by monitoring the voltage between terminals 1220 and 1222.

In a similar manner as concentric coils 900, coils 1206 and 1208 are connected in series, thereby producing approximately 0 V between terminals 1230 and 1232 when wireless power receiver 206 is centered with respect to the y-axis. During wireless power transfer, method 1100 can be used to determine movement and/or placement in the y axis by monitoring the voltage between terminals 1230 and 1232.

In some embodiments, e.g., as shown in FIG. 12, the traces 1210 that connect the coils 1202, 1204, 1206, and 1208 in series are located between the center 1201 and the edge of coils 1202, 1204, 1206, and 1208, in a region of lower electromagnetic field. In some embodiments, traces 1210 have an arc-shape.

In some embodiments, coils 1200 may be implemented in the same flex PCB 906 (e.g., together with coils 900). For example, in some embodiments, coils 1200 are implemented in a first layer of PCB 906 and coils 900 are implemented in a second layer of PCB 906. In some embodiments, coils 1200 are implemented in a dedicated (e.g., flex) PCB. Other implementations are also possible.

In some embodiments, such as in embodiments that implement coils 900 and 1200 in the same PCB 906, movement detection may be performed in the x, y, and z axis, which may advantageously allow for detecting 3D motion. For example, in some embodiments that implement coils 900 and 1200 in the same PCB 906, method 1100 may be performed to detect movement in the z-axis (e.g., while monitoring $\Delta V_{900}$ between terminals 908 and 910 during step 1102 and using the monitored voltage $\Delta V_{900}$ during steps 1104 and 1106). Method 1100 may also be performed to detect movement in the x axis (e.g., while monitoring $\Delta V_{1200x}$ between terminals 1220 and 1222 during step 1102 and using the monitored voltage $\Delta V_{1200x}$ during steps 1104 and 1106). Method 1100 may also be performed to detect movement in the y axis (e.g., while monitoring $\Delta V_{1200y}$ between terminals 1230 and 1232 during step 1102 and using the monitored voltage $\Delta V_{1200y}$ during steps 1104 and 1106).

Figure 13:
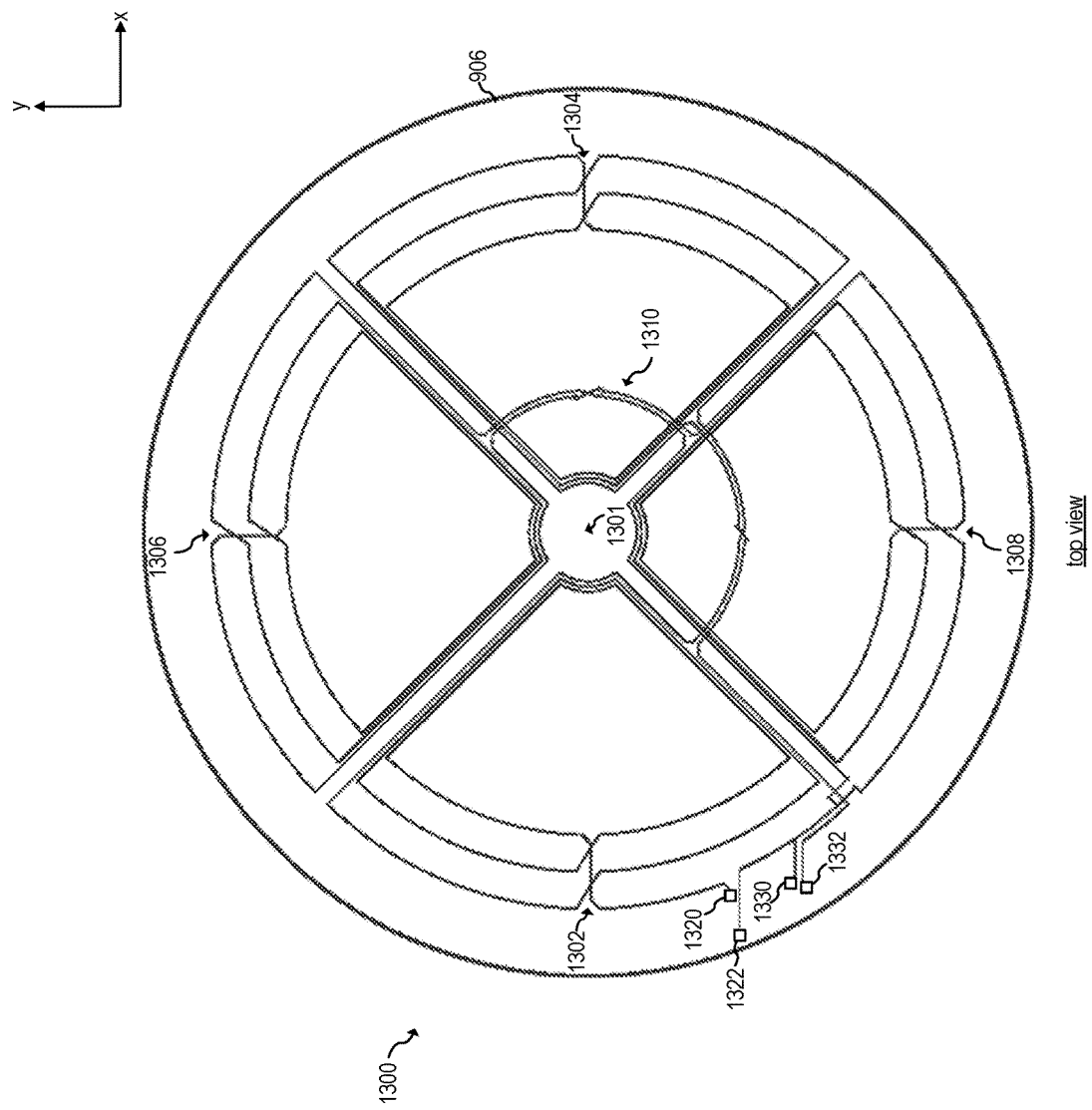

In some embodiments, the size of the wireless power receiver 206 may impact the X-Y movement detection and/or placement. For example, if a wireless power receiver 206 is large and fully covers coils 1202 and 1204, movement in the x-axis may not be detected. Thus, in some embodiments, additional, larger, differential "pizza-slice"-type coils are used. For example, FIG. 13 shows a top view of differential "pizza-slice"-type coils 1300, according to an embodiment of the present invention. Coils 1300 are configured to detect movement in the X-Y plane. Coils 1300 include differential 1302, 1304 for movement detection in the x-axis, and differential coils 1306, and 1308, for movement detection in the y-axis.

Coils 1302 and 1304 are connected in series and operate in a similar manner as coils 1202 and 1204. Coils 1302 and 1304, however, cover a larger area, thereby allowing for detection of movements of a larger receiver 206. Similarly, coils 1306 and 1308 are connected in series and operate in a similar manner as coils 1206 and 1208. Coils 1306 and 1308, however, cover a larger area, thereby allowing for detection of movements of a larger receiver 206.

In some embodiments, coils 1300 may be implemented in the same flex PCB 906 (e.g., together with coils 900 and/or 1200). For example, in some embodiments, coils 1300 are implemented in a first layer of PCB 906, coils 1200 are implemented in a second layer of PCB 906, and coils 900 are implemented in a third layer of PCB 906. In some embodiments, coils 1300 are implemented in a dedicated (e.g., flex) PCB. Other implementations are also possible.

In some embodiments, coils 1200 and 1300 are used to estimate the size of wireless power receiver 206. For example, if coils 1300 detect movement in the x axis (or y axis) but coils 1200 do not, such detection is indicative of a larger device. For example, FIG. 14 shows table illustrating embodiment method 1400 for estimating a size of a wireless power receiver based on movement detection, according to an embodiment of the present invention.

In FIG. 14, column "x-axis small" shows whether movement is detected ("yes") or not ("no") based on voltages $\Delta V_{1200x}$ between terminals 1220 and 1222 determined using fast movement detection (e.g., $V_{1200x\_i} - V_{1200x\_i-1}$); column "x-axis large" shows whether movement is detected ("yes") or not ("no") based on voltages $\Delta V_{1300x}$ between terminals 1320 and 1322 determined using fast movement detection (e.g., $V_{1300x\_i} - V_{1300x\_i-1}$).

Although FIG. 14 illustrates movement in the x axis based on fast movement detection, a similar table applies using small movement detection. Although FIG. 14 illustrates movement in the x axis, a similar table applies to movement in the y axis.

As shown in FIG. 14, detecting movement with the large coils in the x axis while the small coils in the x axis do note detect movement is indicative that the wireless power receiver is large. Detecting movement with the small coils in the x axis while the large coils in the x axis do note detect movement is indicative that the wireless power receiver is small.

In some embodiments, rotation of a wireless power receiver may be determined based on x-y movement detection using small and large coils.

Figure 15:
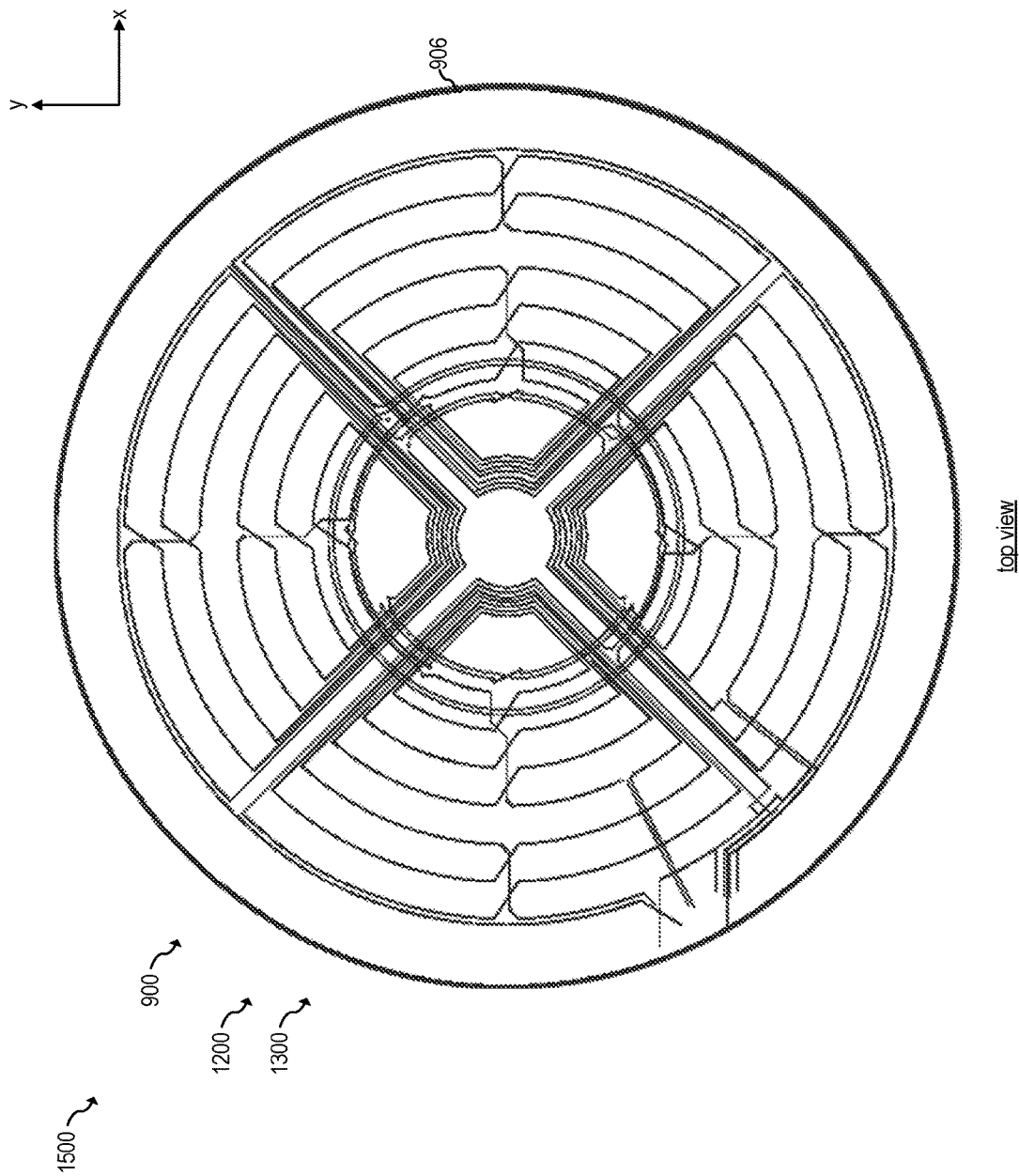
FIG. 15 shows the coils of FIGS. 9,12 and 13 implemented in a single flex PCB according to an embodiment of the present invention.

FIG. 15 shows a top view of coils 900, 1200, and 1300, implemented in flex PCB 906, according to an embodiment of the present invention. Flex PCB 906, including one or more or all of coils 900, 1200, and/or 1300, may be implemented together with IR sensor 416, e.g., as shown in FIGS. 4 and 7. In some embodiments, aligning the traces of coils 900, 1200, and 1300 in flex PCB 906 as shown in FIG. 15 may advantageously allow implementing coils 900, 1200, and 1300 in a two-layer PCB, which may advantageously result in a less complex, lower cost implementation than using more than two layers in the PCB.

In some embodiments, method 1100 may be simultaneously performed on terminals 908 and 910; 1220 and 1222; 1230 and 1232; 1320 and 1322; and 1330 and 1332, to detect 3D motion. For example, by determining motion in the x-axis, y-axis, and z-axis, an estimated direction of movement may be determined.

In some embodiments, the voltages at terminals 908 and 910; 1220 and 1222; 1230 and 1232; 1320 and 1322; and 1330 and 1332 may be used to detect 3D placement of wireless power receiver 206. For example, based on the relative voltages between the x-axis and y-axis (e.g., the difference between the voltage between terminals 1220 and 1222, and the voltage between terminals 1230 and 1232), an x-y placement estimation may be made. In some embodiments, the z distance between wireless power receiver and the transmitting coil $L_{TX}$ may be determined based on the voltage between terminals 908 and 910, e.g., compared to the voltage of the between terminals 1220 and 1222 or the voltage between terminals 1230 and 1232.

In some embodiments, a neural network is used to detect position and/or movement of wireless power receiver 206 based on the outputs of coils 900, 1200, and 1300. For example, FIG. 16 shows multi-level neural network 1602 providing localization classification and movement classification according to an embodiment of the present invention.

Figure 16:
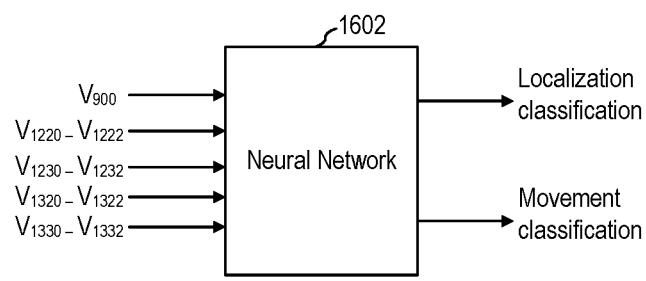
FIG. 16 shows a multi-level neural network providing localization classification and movement classification, according to an embodiment of the present invention.

As shown in FIG. 16, neural network 1602 may receive voltage $V_{900}$ (between terminals 908 and 910), the difference between voltages $V_{1220}$ (at terminal 1220) and $V_{1222}$ (at terminal 1222), the difference between voltages $V_{1230}$ (at terminal 1230) and $V_{1232}$ (at terminal 1232), the difference between voltages $V_{1320}$ (at terminal 1320) and $V_{1322}$ (at terminal 1322), and the difference between voltages $V_{1330}$ (at terminal 1330) and $V_{1232}$ (at terminal 1332), and generate localization classification (e.g., location in a 3D space, such as location in the charging space 201) and/or movement classification (e.g., direction and/or speed of movement).

In some embodiments, neural network 1602 is trained offline (e.g., during a characterization step) using wireless power receivers of various types and sizes, such as tablets, smartphones, smart speakers, smart thermostats, etc. The trained neural network 1602 may be implemented, e.g., by controller 450).

In some embodiments, neural network 1602 may receive additional inputs such as from IR sensor 416.

Figure 17:
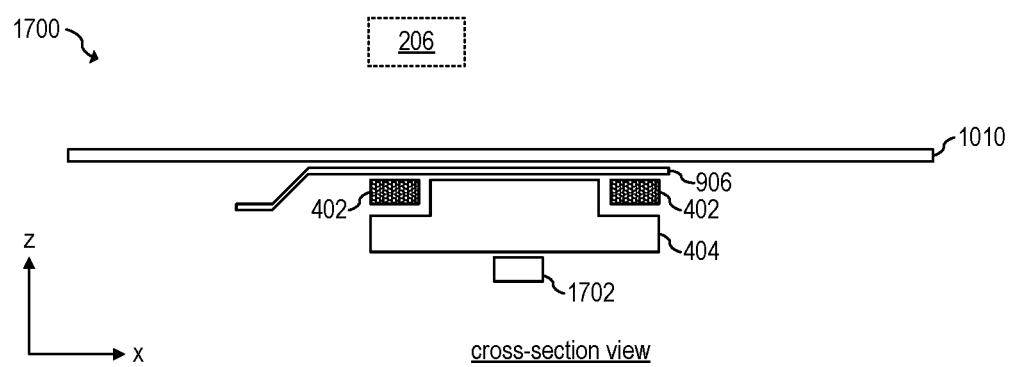
FIG. 17 shows different view of a sub-surface wireless charger, according to an embodiment of the present invention.

In some embodiments, an ultrasound sensor is used to detect movement. For example, FIG. 17 shows different view of sub-surface wireless power transmitter 1700, according to an embodiment of the present invention. Sub-surface wireless power transmitter 202 may be implemented as sub-surface wireless charger 1700. Sub-surface wireless power transmitter 1700 includes housing 1010, transmitting coil 402, ferrite core 404, PCB 406, and ultrasound sensor 1702. Ultrasound sensor 1702 is coupled to ferrite core 404 using, e.g., a gel. A gel may also be used to couple ferrite core 404 to flex PCB 906 and to couple flex PCB 906 to housing 1010 so that the ultrasound waves propagate between ultrasound sensor 1702 to housing 1010. Some embodiments may use other coupling substance different than gel, such as rigid glue. Controller 450 may control ultrasound sensor 1702.

In some embodiments, ultrasound sensor 1702 operates in a similar manner as IR sensor 416, and method 800 may be implemented with ultrasound sensor 1702, except that ultrasound waves are used instead of IR light, and intensity of ultrasound waves are used instead of intensity of IR light. In some embodiments, time of travel for the ultrasound ping can also be used. For example, in some embodiments, a short burst of ultrasonic waves is generated by ultrasound sensor 1702. Ultrasound sensor 1702 (or another ultrasonic sensor) may be used to sample the echo obtained as a result of reflections of some of the transmitted ultrasonic waves. The distances towards the object (e.g., the wireless power receiver 602) may be determined based on the time between the transmitted ultrasonic signals and the received reflected ultrasonic signals and the speed of the ultrasonic waves.

In some embodiments, the frequency of operation of the ultrasound sensor 1702 is the same as the frequency used to transmit power wirelessly using transmitting coil $L_{TX}$ 402, or a harmonic or sub-harmonic of such frequency. In some embodiments, using a frequency of the ultrasound sensor 1702 equal to the frequency of wireless power transmission, or harmonic or sub-harmonic thereof, advantageously avoids interference between wireless power transmission and sensing using the ultrasonic sensor 1702.

In some embodiments, when the frequency of wireless power transmission changes, the frequency of operation of the ultrasound sensor 1702 changes based on the change in frequency of the wireless power transmission.

Figure 18:
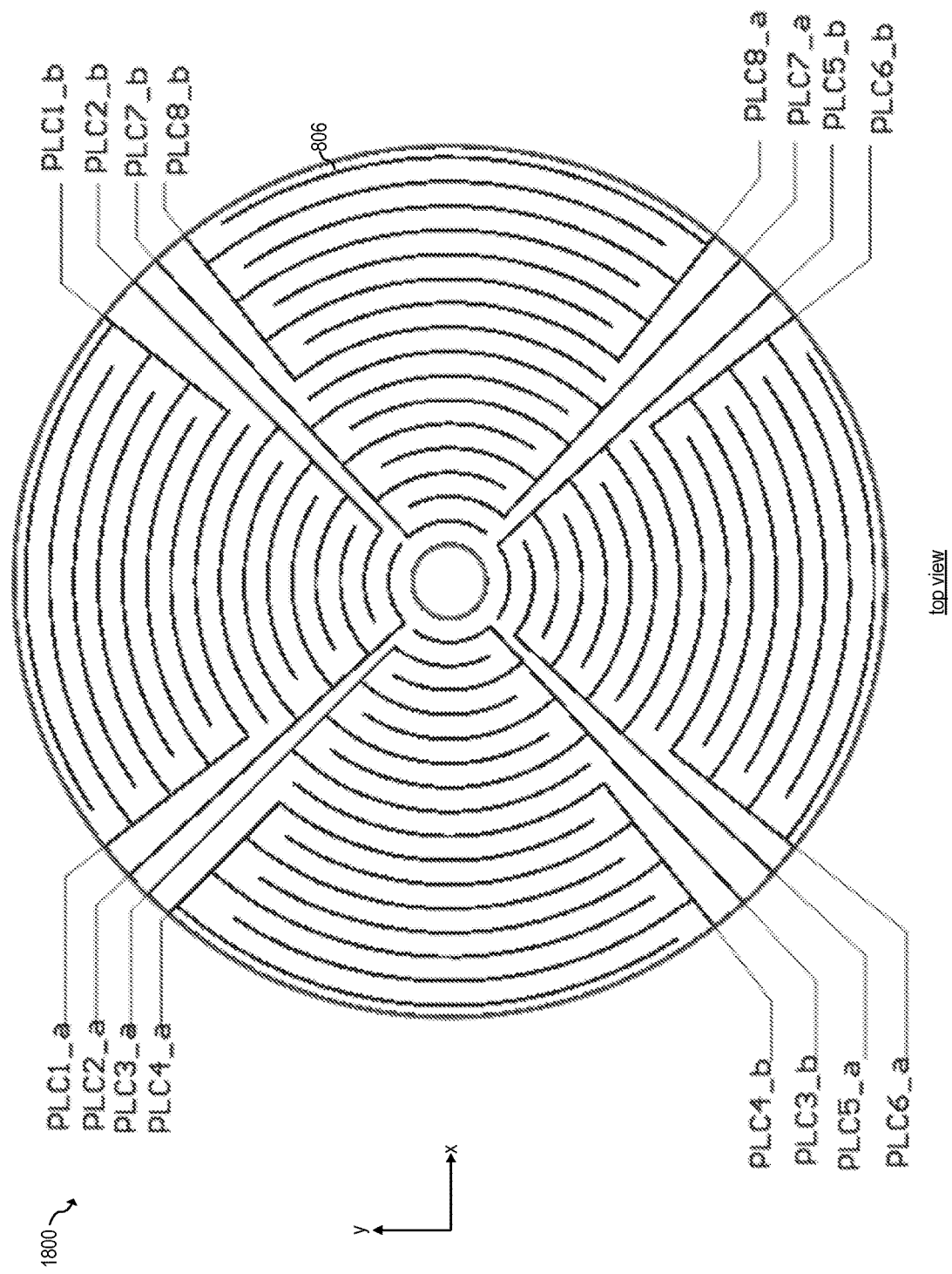
FIG. 18 shows a top view of differential "pizza-slice"-type capacitors, according to an embodiment of the present invention.

In some embodiments, a capacitive sensor is used for detection of X-Y and Z movement. For example, FIG. 18 shows a top view of differential "pizza-slice"-type capacitors 1800, according to an embodiment of the present invention. Capacitors 1800 are configured to detect movement in the X-Y plane and in the Z direction, and may be implemented in the same flex PCB 906. Capacitors 1800 include capacitors PLC4 and PLC8, and PLC3 and PLC7 for movement detection in the x-axis; and capacitors PLC1 and PLC 6, and PLC2 and PLC5, for movement detection in the y-axis. Method 1100 may be implemented with capacitors 1800, in which the capacitance across capacitors (between terminals PLC1_$a$ and PLC1_$b$) are monitored (instead of differential coils, in step 1102), and where the capacitance difference between capacitors is used instead of the voltage difference between coils (e.g., in steps 1104 and 1106). Movement in the Z direction may be detected as a change of the sum of each capacitance.

Example embodiments of the present invention are summarized here. Other embodiments can also be understood from the entirety of the specification and the claims filed herein.

Example 1. A method including: wirelessly transmitting power to a receiving coil from a transmitting coil, where the receiving coil is in a wireless power transmission space of the transmitting coil; measuring an output of a sensor during a first time to generate a first measurement; measuring the output of the sensor during a second time to generate a second measurement, the second time being after the first time; and when a magnitude of a difference between the first measurement and the second measurement is higher than a predetermined threshold, stopping wirelessly transmitting power to the receiving coil with the transmitting coil.

Example 2. The method of example 1, further including periodically measuring the output of the sensor at discrete time steps, where the first time and the second time correspond to consecutive time steps.

Example 3. The method of one of examples 1 or 2, further including periodically measuring the output of the sensor during discrete time step, where the first time and the second time correspond to non-consecutive time steps.

Example 4. The method of one of examples 1 to 3, where the sensor includes a first pizza-slice-type element disposed between the transmitting coil and the wireless power transmission space, where the first pizza-slice-type element is disposed along a first axis for detecting motion along the first axis of a wireless power receiver including the receiving coil, and a second pizza-slice-type element disposed between the transmitting coil and the wireless power transmission space, where the second pizza-slice-type element is disposed along a second axis for detecting motion along the second axis of the wireless power receiver, the second axis being different than the first axis.

Example 5. The method of one of examples 1 to 4, further including determining a position of the wireless power receiver based on outputs from the first and second pizza-slice-type elements.

Example 6. The method of one of examples 1 to 5, where the sensor includes a third pizza-slice-type element disposed between the transmitting coil and the wireless power transmission space, where the third pizza-slice-type element is disposed along the first axis for detecting motion along the first axis of the wireless power receiver, and a fourth pizza-slice-type element disposed between the transmitting coil and the wireless power transmission space, where the fourth pizza-slice-type element is disposed along the second axis for detecting motion along the second axis of the wireless power receiver, the third and fourth pizza-slice-type elements being larger than the first and second pizza-slice-type elements, respectively.

Example 7. The method of one of examples 1 to 6, further including determining a size of the wireless power receiver based on outputs from the first, second, third, and fourth pizza-slice-type elements.

Example 8. The method of one of examples 1 to 7, where the sensor includes a concentric element disposed between the transmitting coil and the wireless power transmission space, where the concentric element is disposed in a plane that includes the first and second axes for detecting motion of the wireless power receiver along a third axis, the third axis being orthogonal to the first and second axes.

Example 9. The method of one of examples 1 to 8, further including determining a location of the wireless power receiver or a velocity of movement of the wireless power receiver based on outputs from the first, second, third, and fourth pizza-slice-type element and based on the concentric element.

Example 10. The method of one of examples 1 to 9, where determining the location or velocity of movement of the wireless power receiver includes using a neural network.

Example 11. The method of one of examples 1 to 10, where the first pizza-slice-type element is a pizza-slice-type coil or a pizza-slice-type capacitor.

Example 12. The method of one of examples 1 to 11, where the second axis is orthogonal to the first axis.

Example 13. The method of one of examples 1 to 12, where the sensor is implemented in a flex circuit printed board (PCB).

Example 14. The method of one of examples 1 to 13, where the sensor includes an IR sensor and where measuring the output of the sensor includes measuring an intensity of an IR signal.

Example 15. The method of one of examples 1 to 14, farther including, before beginning to wirelessly transmit power to the receiving coil from the transmitting coil: transmitting an IR signal towards the wireless charging transmission space using an IR sensor; receiving a reflected IR signal with the IR sensor; determining an intensity of the reflected IR signal; and determining whether to begin wirelessly transmitting power to the receiving coil from the transmitting coil based on the determined intensity of the reflected IR signal.

Example 16. The method of one of examples 1 to 15, where the sensor includes a differential coil, and where measuring the output of the sensor includes measuring a voltage across the differential coil.

Example 17. The method of one of examples 1 to 16, where the sensor includes an ultrasound sensor, and where measuring the output of the sensor includes measuring an intensity of ultrasound waves.

Example 18. The method of one of examples 1 to 17, where the sensor includes a capacitor, and where measuring the output of the sensor includes measuring a capacitance across the capacitor.

Example 19. The method of one of examples 1 to 18, where wirelessly transmitting power to the receiving coil from the transmitting coil includes wirelessly transmitting power through a surface having a thickness between 10 mm and 25 mm.

Example 20. The method of one of examples 1 to 19, where the surface is a transparent surface.

Example 21. The method of one of examples 1 to 20, where the surface is opaque.

Example 22. A wireless power transmitter including: a transmitting coil configured to wireless transmit power towards a wireless power transmission space; a ferrite core; a housing disposed between the transmitting coil and the wireless power transmission space, where the ferrite core is disposed between the transmitting coil and the housing; a sensor; and a controller configured to: measure an output of the sensor during a first time to generate a first measurement, measure the output of the sensor during a second time to generate a second measurement, the second time being after the first time, and when a magnitude of a difference between the first measurement and the second measurement is higher than a predetermined threshold, detect movement of a wireless power receiver in the wireless power transmission space.

Example 23. The wireless power transmitter of example 22, where the controller is further configured to cause the wireless power transmitter to stop wirelessly transmitting power towards the wireless power transmission space in response to detecting movement of the wireless power receiver in the wireless power transmission space.

Example 24. The wireless power transmitter of one of examples 22 or 23, where the sensor includes an IR sensor and a light pipe coupled to the IR sensor, where the IR sensor is configured to transmit IR signals and receive reflected IR signals, and where the light pipe is configured to route the transmitted IR signals from the IR sensor towards the wireless power transmission space and route the reflected IR signals from the wireless transmission space to the IR sensor.

Example 25. The wireless power transmitter of one of examples 22 to 24, where the housing includes a housing opening, and where the light pipe is configured to route the transmitted IR signals through the housing opening towards the wireless power transmission space and receive the reflected IR signals from the wireless transmission space through the housing opening.

Example 26. The wireless power transmitter of one of examples 22 to 25, where the transmitting coil is disposed in a plane, where a centerline orthogonal to the plane crosses a center of the transmitting coil, and where the housing opening includes an opening trench that has a width and a length, the length of the opening trench being lower than the width, where the length of the opening trench is oriented towards the centerline.

Example 27. The wireless power transmitter of one of examples 22 to 26, where the transmitting coil is disposed in a plane, where a centerline orthogonal to the plane crosses a center of the transmitting coil, and where the centerline crosses the housing opening.

Example 28. The wireless power transmitter of one of examples 22 to 27, where the ferrite core includes an opening, where the centerline crosses the opening of the ferrite core, and where the light pipe extends through the opening of the ferrite core.

Example 29. The wireless power transmitter of one of examples 22 to 28, further including an attractor, where the transmitting coil is disposed in a plane, where a centerline orthogonal to the plane crosses a center of the transmitting coil, where the ferrite core includes an opening, and where the attractor is disposed in the opening of the ferrite core.

Example 30. The wireless power transmitter of one of examples 22 to 29, further including a printed circuit board (PCB) disposed between the transmitting coil and the housing, where the sensor includes a sensing element disposed between the transmitting coil and the housing, and where the PCB includes the sensing element.

Example 31. The wireless power transmitter of one of examples 22 to 30, where the sensing element includes concentric differential coils.

Example 32. The wireless power transmitter of one of examples 22 to 31, where the transmitting coil is disposed in a plane, and where a centerline orthogonal to the plane crosses a center of the transmitting coil and a center of the concentric differential coils.

Example 33. The wireless power transmitter of one of examples 22 to 32, where the sensing element includes a pizza-slice-type differential coil.

Example 34. The wireless power transmitter of one of examples 22 to 33, where the sensing element includes a pizza-slice-type capacitor.

Example 35. The wireless power transmitter of one of examples 22 to 34, where the PCB is a flex PCB.

Example 36. The wireless power transmitter of one of examples 22 to 35, where the sensor includes an ultrasonic sensor, and where the controller is configured to measure output of the sensor by measuring an output of the ultrasonic sensor.

Example 37. A wireless power transmitter including: a transmitting coil configured to wireless transmit power towards a wireless power transfer space; a ferrite core; a housing disposed between the transmitting coil and the wireless power transfer space, where the ferrite core is disposed between the transmitting coil and the housing; a flex printed circuit board (PCB) disposed between the transmitting coil and the housing; a first differential coil disposed between the transmitting coil and the housing, the flex PCB including the first differential coil; and a controller configured to: measure an output of the first differential coil during a first time to generate a first measurement, measure the output of the first differential coil during a second time to generate a second measurement, the second time being after the first time, and when a magnitude of a difference between the first measurement and the second measurement is higher than a predetermined threshold, detect movement of a wireless power receiver in the wireless power transfer space.

Example 38. The wireless power transmitter of example 37, where the first differential coil is a concentric differential coil.

Example 39. The wireless power transmitter of one of examples 37 or 38, where the first differential coil is a pizza-slice-type differential coil.

Example 40. The wireless power transmitter of one of examples 37 to 39, where the first differential coil includes first and second coils coupled to each other with a trace having an arc shape.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   wirelessly transmitting power to a receiving coil from a transmitting coil of a wireless power transmitter via a magnetic field, wherein the receiving coil is in a wireless power transmission space of the transmitting coil;
   measuring, by a sensor of the wireless power transmitter, the magnetic field in the wireless power transmission space during a first time and generating an output of a first measurement;
   measuring, by the sensor of the wireless power transmitter, the magnetic field in the wireless power transmission space during a second time and generating an output of a second measurement, the second time being after the first time; and
   when a magnitude of a difference between the first measurement and the second measurement is higher than a predetermined threshold, determining a movement or a position of the receiving coil and stopping wirelessly transmitting power to the receiving coil with the transmitting coil,
   wherein the sensor comprises differential pizza-slice-type coils with a first pizza-slice-type element and a second pizza-slice-type element,
   wherein the first pizza-slice-type element is disposed along a first axis of the wireless power transmitter and configured to detect motion along the first axis by a wireless power receiver comprising the receiving coil, and
   wherein the second pizza-slice-type element is disposed along a second axis of the wireless power transmitter and configured to detect motion along the second axis by the wireless power receiver, the second axis being different than the first axis.

2. The method of claim 1, further comprising periodically measuring the magnetic field by the sensor at discrete time steps, wherein the first time and the second time correspond to consecutive time steps.

3. The method of claim 1, further comprising periodically measuring the magnetic field the sensor during discrete time steps, wherein the first time and the second time correspond to non-consecutive time steps.

4. The method of claim 1, further comprising determining the position of the wireless power receiver based on outputs from the first and second pizza-slice-type elements.

5. The method of claim 1, wherein the differential pizza-slice-type coils comprise a third pizza-slice-type element and a fourth pizza-slice-type element, wherein the third pizza-slice-type element is disposed along the first axis detecting the motion along the first axis of the wireless power receiver, and wherein the fourth pizza-slice-type element is disposed along the second axis detecting the motion along the second axis of the wireless power receiver, the third and fourth pizza-slice-type elements being larger than the first and second pizza-slice-type elements, respectively.

6. The method of claim 5, further comprising determining a size of the wireless power receiver based on outputs from the first, second, third, and fourth pizza-slice-type elements.

7. The method of claim 1, wherein the sensor further comprises a concentric element disposed between the transmitting coil and the wireless power transmission space, and wherein the concentric element is disposed in a plane that comprises the first and second axes detecting the motion of the wireless power receiver along a third axis, the third axis being orthogonal to the first and second axes.

8. The method of claim 7, further comprising determining a location of the wireless power receiver or a velocity of movement of the wireless power receiver based on outputs from the first, second, third, and fourth pizza-slice-type elements and based on the concentric element.

9. The method of claim 8, wherein determining the location or the velocity of movement of the wireless power receiver comprises using a neural network.

10. The method of claim 1, wherein the second axis is orthogonal to the first axis.

11. The method of claim 1, wherein the sensor is implemented in a flex circuit printed board (PCB).

12. The method of claim 1, wherein the sensor comprises a differential coil, and wherein measuring the output of the sensor comprises measuring a voltage across the differential coil.

13. The method of claim 1, wherein wirelessly transmitting the power to the receiving coil from the transmitting coil comprises wirelessly transmitting the power through a surface having a thickness between 10 mm and 25 mm.

14. The method of claim 13, wherein the surface is a transparent surface.

15. The method of claim 13, wherein the surface is opaque.

16. A wireless power transmitter comprising:
   a transmitting coil configured to wireless transmit power via a magnetic field towards a wireless power transmission space;
   a ferrite core;
   a housing disposed between the transmitting coil and the wireless power transmission space, wherein the ferrite core and the transmitting coil are disposed in the housing;

a sensor comprising concentric differential coils having an inner coil and an outer coil so that respective currents are flowable through the inner and outer coils in opposite directions, wherein the inner coil and the outer coil have the same inductance; and a controller configured to:
measure, via the sensor, the magnetic field in the wireless power transmission space during a first time and generate a first measurement,
measure, via the sensor, the magnetic field in the wireless power transmission space during a second time and generate a second measurement, the second time being after the first time, and
when a magnitude of a difference between the first measurement and the second measurement is higher than a predetermined threshold, determine a movement or a position of a wireless power receiver in the wireless power transmission space.

17. The wireless power transmitter of claim 16, wherein the controller is further configured to cause the wireless power transmitter to stop wirelessly transmitting power towards the wireless power transmission space in response to detecting the movement of the wireless power receiver in the wireless power transmission space.

18. The wireless power transmitter of claim 16, further comprising an attractor, wherein the transmitting coil is disposed in a plane, wherein a centerline orthogonal to the plane crosses a center of the transmitting coil, wherein the ferrite core comprises an opening, and wherein the attractor is disposed at the opening of the ferrite core.

19. The wireless power transmitter of claim 16, further comprising a printed circuit board (PCB) disposed between the transmitting coil and the housing, wherein the sensor is disposed between the transmitting coil and the housing, and wherein the PCB comprises the sensor.

20. The wireless power transmitter of claim 16, wherein the transmitting coil is disposed in a plane, and wherein a centerline orthogonal to the plane crosses a center of the transmitting coil and a center of the concentric differential coils.

21. The wireless power transmitter of claim 19, wherein the sensor comprises a pizza-slice-type differential coil.

22. The wireless power transmitter of claim 19, wherein the PCB is a flex PCB.

23. The wireless power transmitter of claim 16, wherein the inner coil has two turns and the outer coil has one turn.

24. A wireless power transmitter comprising:
a transmitting coil configured to wirelessly transmit power via a magnetic field towards a wireless power transmission space;
a ferrite core;
a housing disposed between the transmitting coil and the wireless power transmission space, wherein the ferrite core and the transmitting coil are disposed in the housing;
a sensor comprising differential pizza-slice-type coils with a first pizza-slice-type element and a second pizza-slice-type element, wherein the first pizza-slice-type element is disposed along a first axis of the wireless power transmitter and configured to detect motion along the first axis by a wireless power receiver comprising the receiving coil, and wherein the second pizza-slice-type element is disposed along a second axis of the wireless power transmitter and configured to detect motion along the second axis by the wireless power receiver, the second axis being different than the first axis; and
a controller configured to:
measure, via the sensor, the magnetic field in the wireless power transmission space during a first time and generate a first measurement,
measure, via the sensor, the magnetic field in the wireless power transmission space during a second time and generate a second measurement, the second time being after the first time, and
when a magnitude of a difference between the first measurement and the second measurement is higher than a predetermined threshold, determine a movement or a position of the wireless power receiver in the wireless power transmission space.

25. The wireless power transmitter of claim 24, wherein the differential pizza-slice-type coils comprise a third pizza-slice-type element and a fourth pizza-slice-type element, wherein the third pizza-slice-type element is disposed along the first axis configured to detect the motion along the first axis of the wireless power receiver, and wherein the fourth pizza-slice-type element is disposed along the second axis configured to detect motion along the second axis of the wireless power receiver, the third and fourth pizza-slice-type elements being larger than the first and second pizza-slice-type elements, respectively.

26. The wireless power transmitter of claim 25, wherein the controller is further configured to determine a size of the wireless power receiver based on outputs from the first, second, third, and fourth pizza-slice-type elements.

27. The wireless power transmitter of claim 24, wherein the differential pizza-slice-type coils are disposed between the transmitting coil and the wireless power transmission space.

28. The wireless power transmitter of claim 24, wherein the second axis is orthogonal to the first axis.

* * * * *